United States Patent
Uchida

(10) Patent No.: US 9,450,455 B2
(45) Date of Patent: Sep. 20, 2016

(54) MAGNETIC RESONANCE POWER TRANSMITTER AND MAGNETIC RESONANCE POWER RECEIVER

(75) Inventor: Akiyoshi Uchida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 909 days.

(21) Appl. No.: 13/462,014

(22) Filed: May 2, 2012

(65) Prior Publication Data

US 2012/0212074 A1 Aug. 23, 2012

Related U.S. Application Data

(63) Continuation of application No. PCT/JP2009/070953, filed on Dec. 16, 2009.

(51) Int. Cl.
*H02J 17/00* (2006.01)

(52) U.S. Cl.
CPC .............. *H02J 17/00* (2013.01); *H02J 50/12* (2016.02); *H02J 50/80* (2016.02)

(58) Field of Classification Search
None
See application file for complete search history.

(56) References Cited

U.S. PATENT DOCUMENTS

| | | | |
|---|---|---|---|
| 5,760,584 A | 6/1998 | Frederick | |
| 7,103,408 B2 | 9/2006 | Haller et al. | |
| 7,120,992 B2 | 10/2006 | He et al. | |
| 7,132,173 B2 | 11/2006 | Daulton | |
| 7,177,698 B2 | 2/2007 | Klosterman et al. | |
| 7,351,921 B1 | 4/2008 | Haller et al. | |
| 7,428,438 B2 | 9/2008 | Parramon et al. | |
| 7,437,193 B2 | 10/2008 | Parramon et al. | |
| 7,587,241 B2 | 9/2009 | Parramon et al. | |
| 2001/0012768 A1* | 8/2001 | Odachi et al. | 455/80 |
| 2004/0058186 A1 | 3/2004 | Daulton | |
| 2004/0059392 A1 | 3/2004 | Parramon et al. | |
| 2004/0088032 A1 | 5/2004 | Haller et al. | |
| 2004/0098068 A1 | 5/2004 | Carbunaru et al. | |
| 2005/0021108 A1 | 1/2005 | Klosterman et al. | |
| 2005/0052179 A1* | 3/2005 | Herzer | G01D 5/24419 324/207.24 |
| 2005/0057905 A1 | 3/2005 | He et al. | |
| 2005/0119716 A1 | 6/2005 | McClure et al. | |
| 2005/0131494 A1 | 6/2005 | Park et al. | |

(Continued)

FOREIGN PATENT DOCUMENTS

| | | |
|---|---|---|
| CN | 1179543 A | 4/1998 |
| CN | 1220781 A | 6/1999 |

(Continued)

OTHER PUBLICATIONS

Chinese Office Action issued in corresponding Chinese Application No. 200980162438.7, dated Jan. 6, 2014 (with translation).

(Continued)

*Primary Examiner* — Jared Fureman
*Assistant Examiner* — Aqeel Bukhari
(74) *Attorney, Agent, or Firm* — Greer Burns & Crain Ltd.

(57) ABSTRACT

A magnetic resonance power transmitter of a magnetic resonance wireless power transmission system includes a resonance coil, an alternating current power source configured to cause the resonance coil to generate an alternating current, and a frequency changer configured to change, based on communication data, a frequency of the alternating current that the alternating current power source causes the resonance coil to generate.

10 Claims, 21 Drawing Sheets

(56) References Cited

U.S. PATENT DOCUMENTS

| | | |
|---|---|---|
| 2005/0131495 A1 | 6/2005 | Parramon et al. |
| 2007/0032839 A1 | 2/2007 | Parramon et al. |
| 2007/0057025 A1 | 3/2007 | Daulton |
| 2007/0073360 A1 | 3/2007 | He et al. |
| 2007/0135867 A1 | 6/2007 | Klosterman et al. |
| 2007/0222542 A1 | 9/2007 | Joannopoulos et al. |
| 2008/0121419 A1 | 5/2008 | Haller et al. |
| 2008/0174267 A1 | 7/2008 | Onishi et al. |
| 2008/0200119 A1 | 8/2008 | Onishi et al. |
| 2008/0231120 A1 | 9/2008 | Jin |
| 2008/0266748 A1 | 10/2008 | Lee |
| 2008/0278264 A1 | 11/2008 | Karalis et al. |
| 2009/0072629 A1 | 3/2009 | Cook et al. |
| 2009/0121713 A1 | 5/2009 | Van Helvoort |
| 2009/0146892 A1 | 6/2009 | Shimizu et al. |
| 2009/0243397 A1 | 10/2009 | Cook et al. |
| 2010/0052431 A1* | 3/2010 | Mita ............................ 307/104 |
| 2012/0001485 A1 | 1/2012 | Uchida |

FOREIGN PATENT DOCUMENTS

| | | |
|---|---|---|
| CN | 101272063 A | 9/2008 |
| CN | 101330229 A | 12/2008 |
| CN | 101453234 A | 6/2009 |
| CN | 101667754 A | 3/2010 |
| CN | 102362408 A | 2/2012 |
| EP | 0 905 856 A1 | 3/1999 |
| EP | 1517725 | 3/2005 |
| EP | 1779550 | 5/2007 |
| EP | 1902505 | 3/2008 |
| EP | 1883348 | 3/2010 |
| JP | 62-257052 | 11/1987 |
| JP | 02-078347 | 3/1990 |
| JP | 06-054824 | 3/1994 |
| JP | 06-245326 | 9/1994 |
| JP | 8-29143 | 3/1996 |
| JP | 2004-350117 | 12/2004 |
| JP | 2005-531371 | 10/2005 |
| JP | 2008-508842 | 3/2008 |
| JP | 2008-178195 | 7/2008 |
| JP | 2008-535611 | 9/2008 |
| JP | 2009-501510 | 1/2009 |
| JP | 2009-106136 | 5/2009 |
| JP | 2009-253763 | 10/2009 |
| JP | 2010-068632 | 3/2010 |
| JP | 2010-124522 | 6/2010 |
| WO | WO 2004/002572 A1 | 1/2004 |
| WO | WO 2006011769 | 2/2006 |
| WO | WO 2006/109229 | 10/2006 |
| WO | WO 2007/008646 | 1/2007 |

OTHER PUBLICATIONS

Int'l. Search Report issued in Int'l. App. No. PCT/JP2009/070953, mailed Mar. 30, 2010.

Kurs et al.; Wireless Power Transfer via Strongly Coupled Magnetic Resonances; Science, Jul. 6, 2007; vol. 317, pp. 83-86.

Soljacic et al.; "Technology Developed for Wireless Power Transfer 60 watt Light Bulb li in Experiment"; Nikkei Electronics, Dec. 3, 2007; No. 966, pp. 117 to 128.

Yuan et al.; Wireless Power Transfer Efficiency between Helical Coils; Processing of the 2008 IEICE General Conference; Mar. 5, 2008; B-1-14, p. 14.

Korean Office Action issued for corresponding Korean Application No. 10-2012-7010188, dated Aug. 6, 2013 (with full translation).

Japanese Office Action issued in corresponding Japanese Application No. 2011-545885, issued Aug. 6, 2013.

Chinese Office Action issued in corresponding Chinese Application No. 200980162438.7, issued Jan. 21, 2015 (with translation).

Chinese Office Action issued in corresponding Chinese Application No. 200980162438.7, issued Jul. 31, 2015 (with translation).

EP Search report issued on Jul. 1, 2016, in corresponding EP App. No. 09852275.8.

\* cited by examiner

LC RESONANCE
CIRCUIT

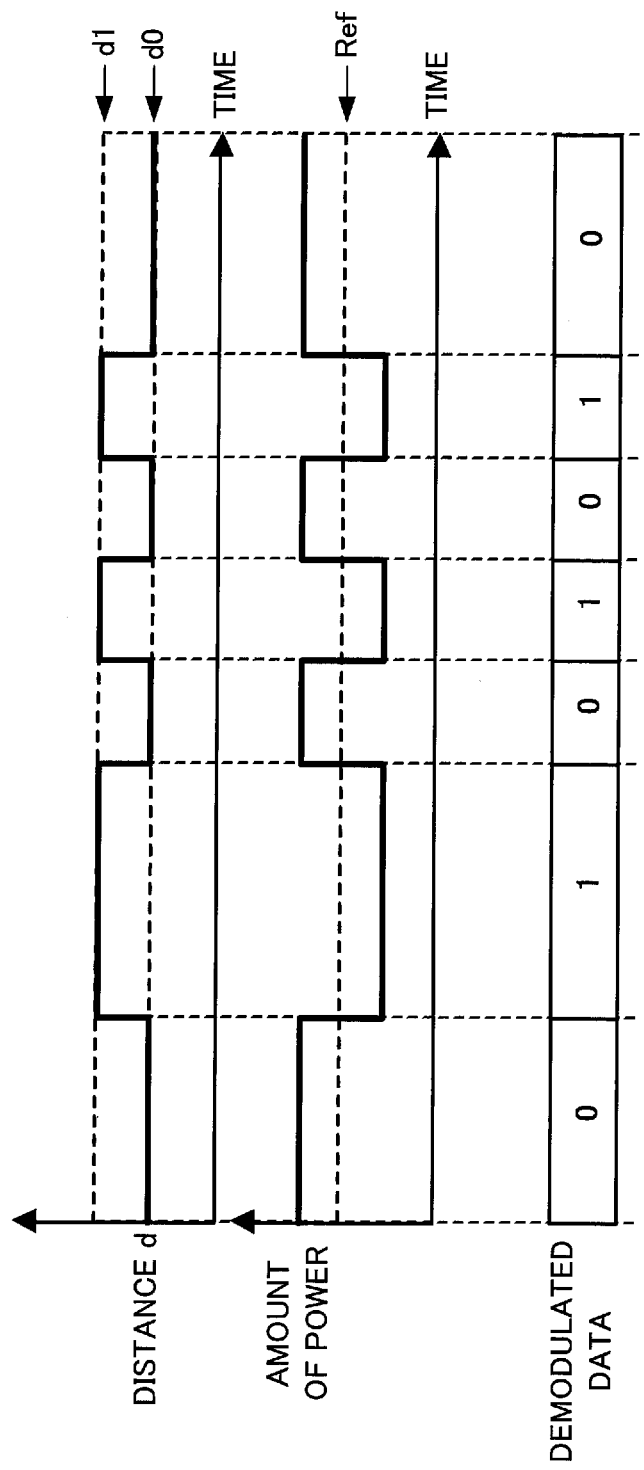

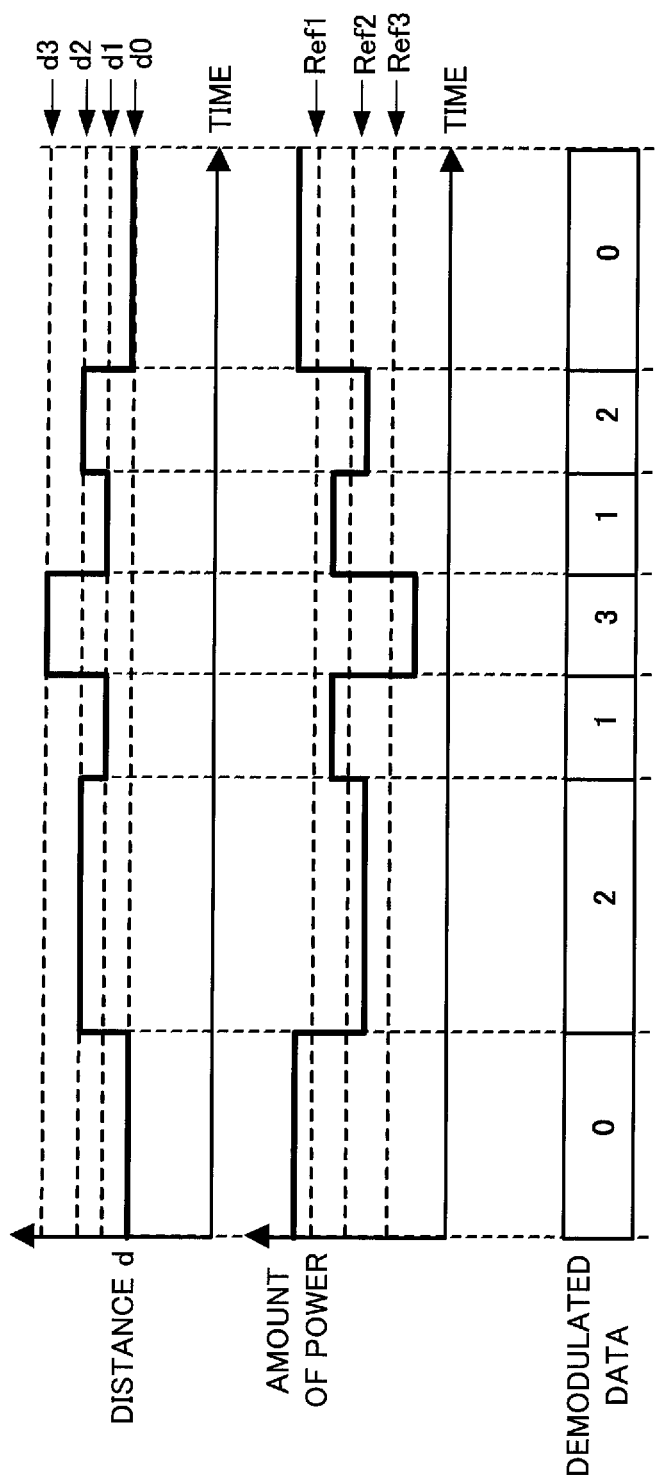

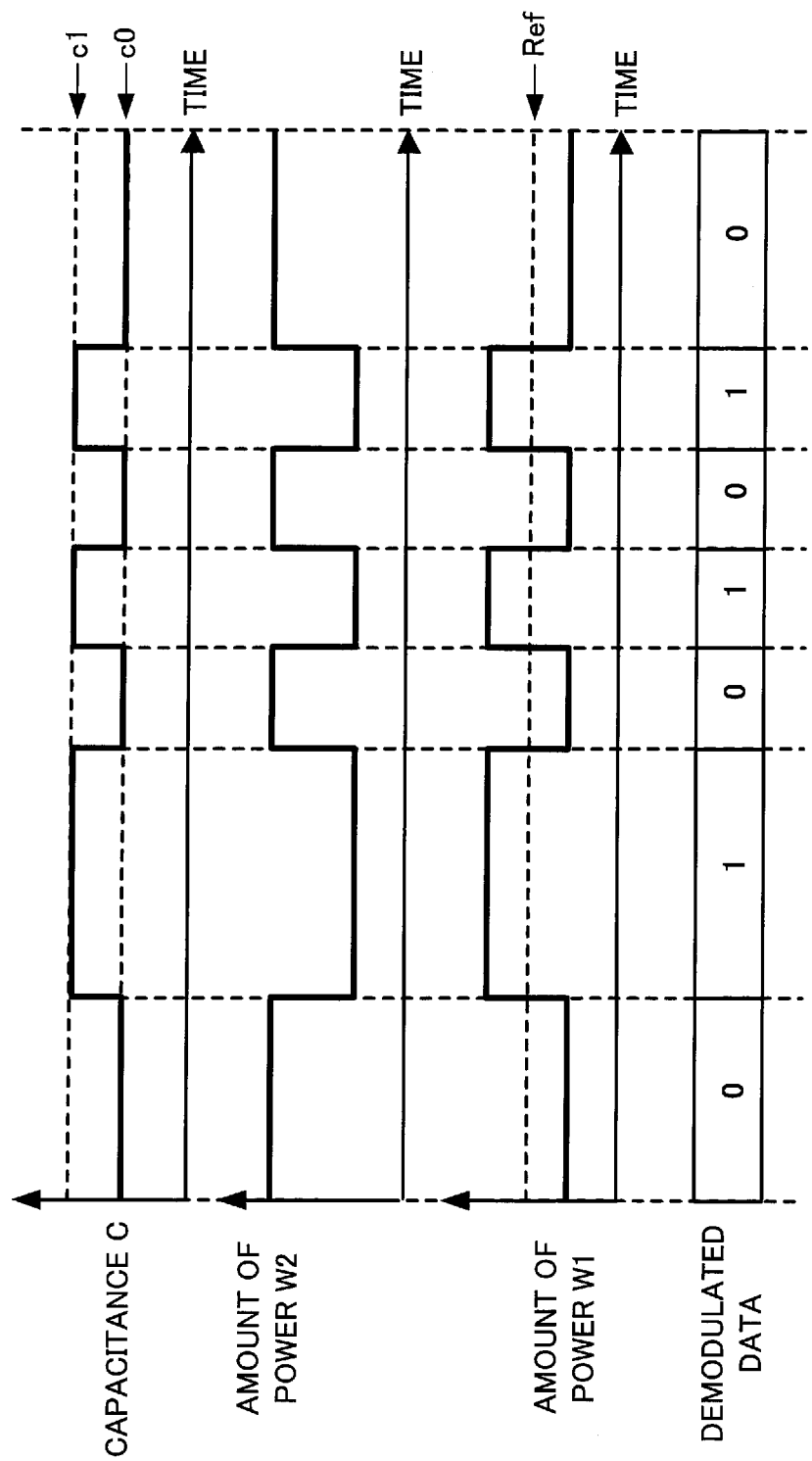

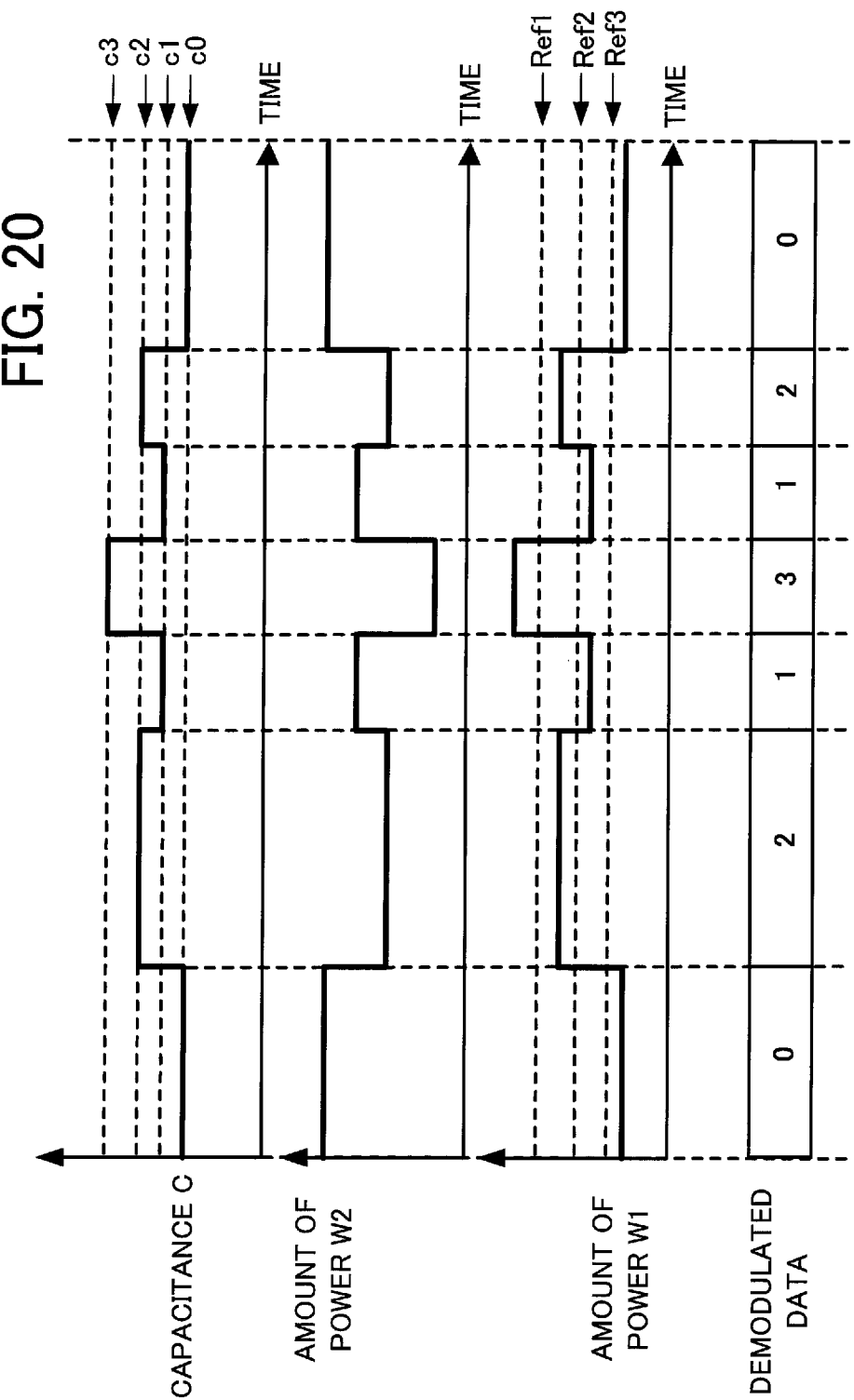

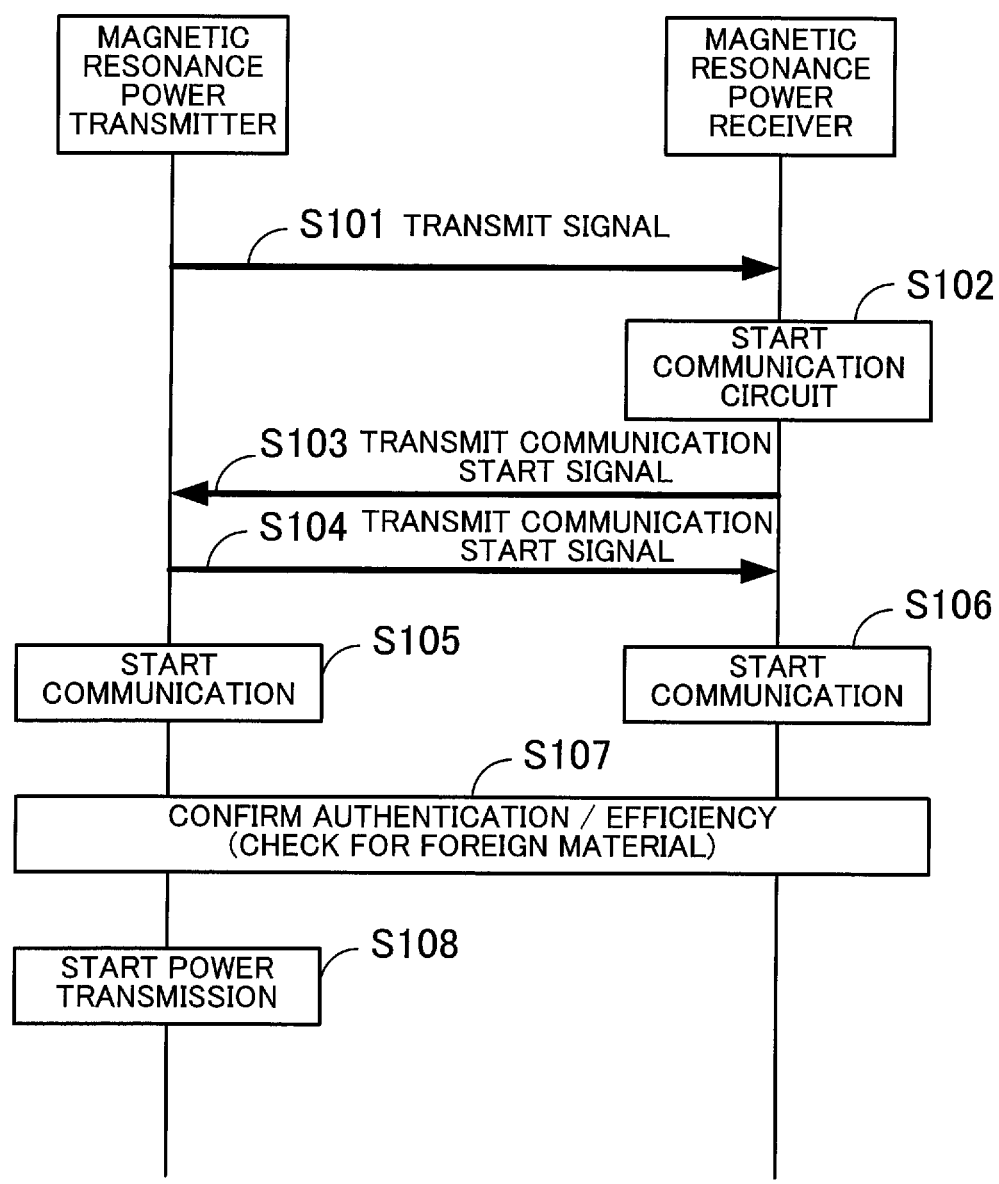

MAGNETIC RESONANCE POWER TRANSMITTER AND MAGNETIC RESONANCE POWER RECEIVER

CROSS-REFERENCE TO RELATED APPLICATION

This application is a continuing application, filed under 35 U.S.C. §111(a), of International Application PCT/JP2009/070953, filed on Dec. 16, 2009.

FIELD

The embodiments discussed herein relate to a magnetic resonance power transmitter and a magnetic resonance power receiver used for wireless power transmission by magnetic resonance.

BACKGROUND

There exists a magnetic resonance wireless power transmission system that performs wireless power transmission by magnetic resonance. The magnetic resonance wireless power transmission system has a power transmitter including a resonance coil and a power receiver including a resonance coil, and the resonance coil included in the power transmitter and the resonance coil included in the power receiver have the same resonance frequency.

When power is supplied to the resonance coil of the power transmitter and an alternating current having the same frequency as the resonance frequency of the resonance coil is caused to flow, power is transmitted by magnetic resonance between the resonance coil of the power transmitter and the resonance coil of the power receiver and an alternating current flows through the resonance coil of the power receiver. In this manner, power is transmitted from the power transmitter to the power receiver wirelessly.

As the wireless power transmission system, there exist, for example, a wireless power transmission system using electric waves and a wireless power transmission system using electromagnetic induction in addition to the magnetic resonance wireless power transmission system. Compared to those other power transmission systems, the magnetic resonance wireless power transmission system has, for example, the following merits. It is possible for the magnetic resonance wireless power transmission system to transmit large power compared to the wireless power transmission system using electric waves. Further, it is possible for the magnetic resonance wireless power transmission system to extend the power transmission distance compared to the wireless power transmission system using electromagnetic induction and also possible to downsize each resonance coil of the power transmitter and the power receiver.

On the other hand, in the wireless power transmission system, it is necessary to perform wireless communication between the power transmitter and the power receiver in order to grasp the transmitted power to determine an electric power rate in accordance with the transmitted power and to prevent power transmission to other than the transmission target by authenticating the power receiver.

Hence, it is considered to provide a function to perform wireless communication also in the magnetic resonance wireless power transmission system.

For example, there is a technique to transmit the charge level of a built-in power source of an implantable micro stimulator to outside by non-contact communication (e.g. Japanese National Publication of International Patent Application No. 2005-531371). Further, there is a technique that uses a magnetic field and resonance for non-contact communication (e.g. Japanese National Publication of International Patent Application No. 2008-535611, Japanese Laid-Open Patent Publication No. 06-54824, and Japanese Examined Patent Application Publication No. 08-29143).

However, if the already existing non-contact communication function is simply added to the magnetic resonance wireless power transmission system, there is a possibility that the costs of the power transmitter and the power receiver increase because it is necessary to newly provide a communication module to the power transmitter and the power receiver.

SUMMARY

According to an aspect of the invention, there is provided a magnetic resonance power transmitter. This magnetic resonance power transmitter includes a resonance coil; an alternating current power source configured to cause the resonance coil to generate an alternating current; and a frequency changer configured to change, based on communication data, a frequency of the alternating current that the alternating current power source causes the resonance coil to generate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING

FIG. 10 is a timing chart illustrating an example of data transmission of the magnetic resonance wireless power transmission system according to the second embodiment;

FIG. 11 is a timing chart illustrating an example of data transmission of the magnetic resonance wireless power transmission system according to the second embodiment;

FIG. 19 is a timing chart illustrating an example of data transmission of the magnetic resonance wireless power transmission system according to the fifth embodiment;

FIG. 20 is a timing chart illustrating an example of data transmission of the magnetic resonance wireless power transmission system according to the fifth embodiment; and FIG. 21 is a sequence diagram illustrating an example of a communication procedure of a magnetic resonance wireless power transmission system according to a sixth embodiment.

DESCRIPTION OF EMBODIMENTS

Figure 1:
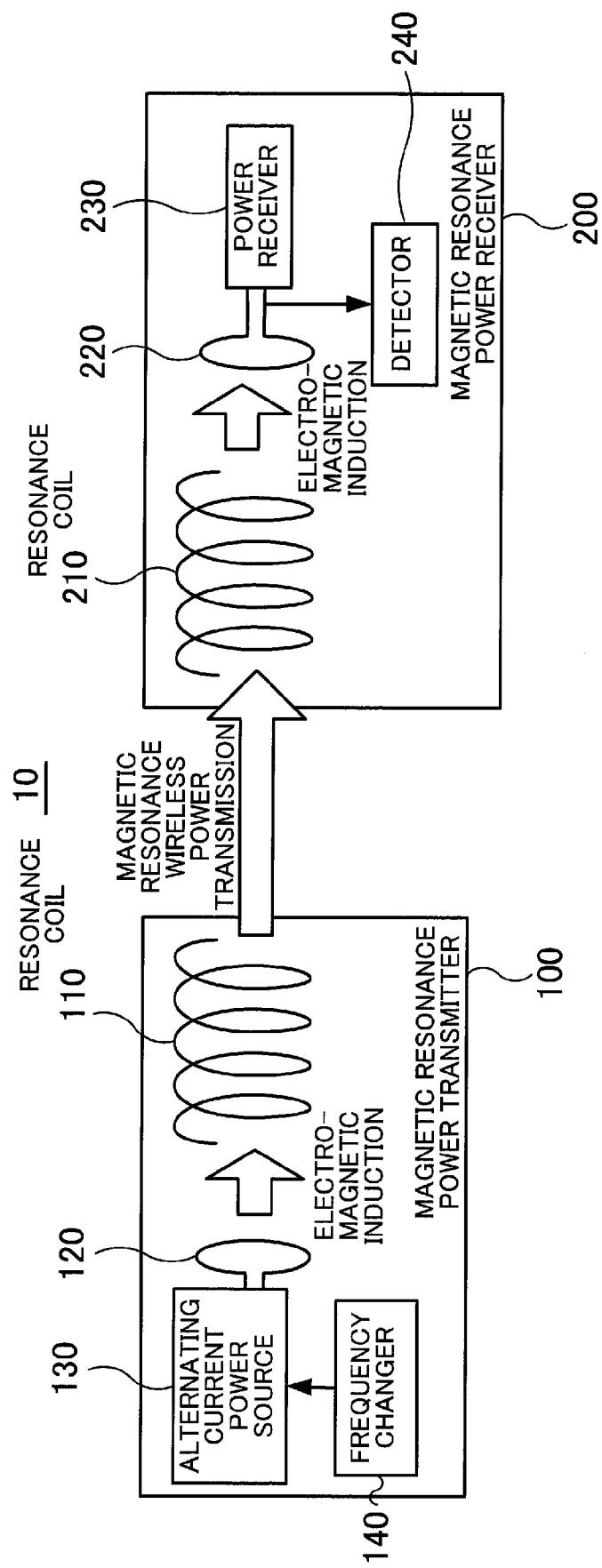
FIG. 1 illustrates an example of a magnetic resonance wireless power transmission system according to a first embodiment.

Several embodiments will be described below with reference to the accompanying drawings, wherein like reference numerals refer to like elements throughout.

(First Embodiment)

FIG. 1 illustrates an example of a magnetic resonance wireless power transmission system according to a first embodiment.

A magnetic resonance wireless power transmission system 10 includes a magnetic resonance power transmitter 100 configured to transmit power and a magnetic resonance power receiver 200 configured to receive power transmitted from the magnetic resonance power transmitter 100.

The magnetic resonance power transmitter 100 has a resonance coil 110, a coil 120 configured to supply power to the resonance coil 110 by electromagnetic induction, and an alternating current power source 130 configured to cause the coil 120 to generate an alternating current.

As the material of the resonance coil 110, for example, copper (Cu) is used. As the resonance coil 110, for example, a helical coil having a diameter of 30 cm is used. The resonance coil 110 configures an LC resonance circuit having an inductance L and a capacitance C and has the resonance frequency same as the transmission frequency. Here, the transmission frequency refers to the frequency of transmission wave used to transmit power from the magnetic resonance power transmitter 100 to the magnetic resonance power receiver 200.

The resonance frequency of the resonance coil 110 is, for example, 10 MHz. Further, in the resonance coil 110, the capacitance C is obtained by the floating capacitance of the resonance coil 110, but it may also be possible to obtain the capacitance C by providing a capacitor between coil wires of the resonance coil 110.

When power is supplied from the coil 120 by electromagnetic induction and an alternating current having the same frequency as the resonance frequency flows, the resonance coil 110 performs wireless power transmission by magnetic resonance toward the magnetic resonance power receiver 200.

The alternating current power source 130 connects with the coil 120 and causes the coil 120 to generate an alternating current having the same frequency as the transmission frequency, for example, 10 MHz.

As the material of the coil 120, for example, copper (Cu) is used. When an alternating current is supplied from the alternating current power source 130, the coil 120 supplies power to the resonance coil 110 by electromagnetic induction and causes the resonance coil 110 to generate an alternating current.

Here, the frequency of the alternating current flowing through the coil 120 agrees with the frequency of the alternating current generated in the resonance coil 110. That is, when an alternating current having the same frequency as the transmission frequency, for example, 10 MHz, is supplied to the coil 120, an alternating current having the same frequency as the transmission frequency, for example, 10 MHz, flows through the resonance coil 110.

As described above, power is supplied to the resonance coil 110 not via a wire etc. but by electromagnetic induction. Due to this, it is possible to prevent the resistance of the alternating current power source 130 and the wire etc. for power supply from being added to the resonance coil 110, thus enabling obtaining of the high precision resonance coil 110 having the resonance frequency same as the target frequency.

When it is possible to maintain sufficient precision of the resonance frequency of the resonance coil 110, it may also be possible to supply power directly to the resonance coil 110 from the alternating current power source 130 by connecting the alternating current power source 130 to the resonance coil 110.

Further, the magnetic resonance power transmitter 100 has a frequency changer 140 configured to change the frequency of an alternating current that the alternating current power source 130 causes the coil 120 to generate.

The frequency changer 140 modulates, based on communication data, the frequency of an alternating current generated by the alternating current power source 130 when the magnetic resonance power transmitter 100 and the magnetic resonance power receiver 200 communicate with each other. When the frequency of the alternating current generated by the alternating current power source 130 is modulated as described above, the amount of power transmitted by the resonance coil 110 is modulated accordingly.

That is, communication data is transmitted from the resonance coil 110 to the magnetic resonance power receiver 200 as a modulated signal of the amount of power. The frequency changer 140 maintains the frequency of the alternating current generated by the alternating current power source 130 to the transmission frequency at the time of power transmission.

Next, the magnetic resonance power receiver 200 is explained.

The magnetic resonance power receiver 200 has a resonance coil 210 to which power is transmitted from the resonance coil 110 of the magnetic resonance power transmitter 100 and a coil 220 to which the power transmitted to the resonance coil 210 is supplied. The distance between the resonance coil 110 and the resonance coil 210 at the time of power transmission is supposed to be, for example, about several tens cm to 2 m.

As the material of the resonance coil 210, for example, copper (Cu) is used. As the resonance coil 210, for example, a helical coil having a diameter of 30 cm is used. The resonance coil 210 configures an LC resonance circuit having the inductance L and the capacitance C and has the resonance frequency same as the transmission frequency. That is, the resonance frequency of the resonance coil 210 agrees with the resonance frequency of the resonance coil 110.

The resonance frequency of the resonance coil 210 is, for example, 10 MHz. In the resonance coil 210, the capacitance C is obtained by the floating capacitance of the resonance coil 210, but it may also be possible to obtain the capacitance C by providing a capacitor between coil wires of the resonance coil 210.

Further, when power is transmitted by magnetic resonance from the resonance coil 110 of the magnetic resonance power transmitter 100 at the time of power transmission, an alternating current having the same frequency as the transmission frequency flows through the resonance coil 210.

Further, to the resonance coil 210, a modulated signal of the amount of power is transmitted from the resonance coil 110 of the magnetic resonance power transmitter 100 at the time of communication and an alternating current in the magnitude according to the modulated signal flows therethrough. That is, the modulated signal of the amount of power is propagated from the resonance coil 110 to the resonance coil 210.

As the material of the coil 220, for example, copper (Cu) is used. When an alternating current flows through the resonance coil 210, power is supplied by electromagnetic induction to the coil 220 from the resonance coil 210 and an alternating current is generated.

As described above, the supply of power from the resonance coil 210 is not via a wire etc. but by electromagnetic induction. Hence, it is possible to prevent resistance from being added to the resonance coil 210, thus enabling obtaining of the high precision resonance coil 210 having the resonance frequency same as the target frequency.

Further, through the coil 220, an alternating current in the magnitude according to the modulated signal of the amount of power propagated to the resonance coil 110 flows at the time of communication. That is, the modulated signal of the amount of power is propagated from the resonance coil 110 to the coil 220.

Furthermore, the magnetic resonance power receiver 200 has a power receiver 230 configured to receive power supplied to the coil 220 and a detector 240 configured to detect the magnitude of power supplied to the coil 220.

In the power receiver 230, for example, a power consumer or a power accumulator, such as a battery, is used. When it is possible to maintain sufficient precision of the resonance frequency of the resonance coil 210, it may also be possible to connect the power receiver 230 to the resonance coil 210 so that the power receiver 230 may receive power directly from the resonance coil 210.

The detector 240 detects the modulated signal of the amount of power propagated to the coil 220 at the time of communication and generates demodulated data including, for example, 1-bit data or 2-bit data by comparing the detected modulated signal with a reference amount of power.

As described above, in the magnetic resonance wireless power transmission system 10, both the resonance coil 110 and the resonance coil 210 have the resonance frequency same as the transmission frequency. Hence, when power is supplied to the resonance coil 110 to cause an alternating current to flow therethrough, power transmission by magnetic resonance is performed between the resonance coil 110 and the resonance coil 210 and an alternating current flows through the resonance coil 210. In this manner, power is transmitted wirelessly from the resonance coil 110 to the resonance coil 210.

Further, in the magnetic resonance wireless power transmission system 10, the frequency changer 140 modulates the frequency of the alternating current generated in the coil 120 based on communication data and thus the modulated signal of the amount of power is transmitted from the resonance coil 110 to the resonance coil 210. The modulated signal of the amount of power transmitted to the resonance coil 210 is demodulated by the detector 240 and demodulated data is generated. In this manner, wireless communication of data from the magnetic resonance power transmitter 100 to the magnetic resonance power receiver 200 is performed.

Figure 2:
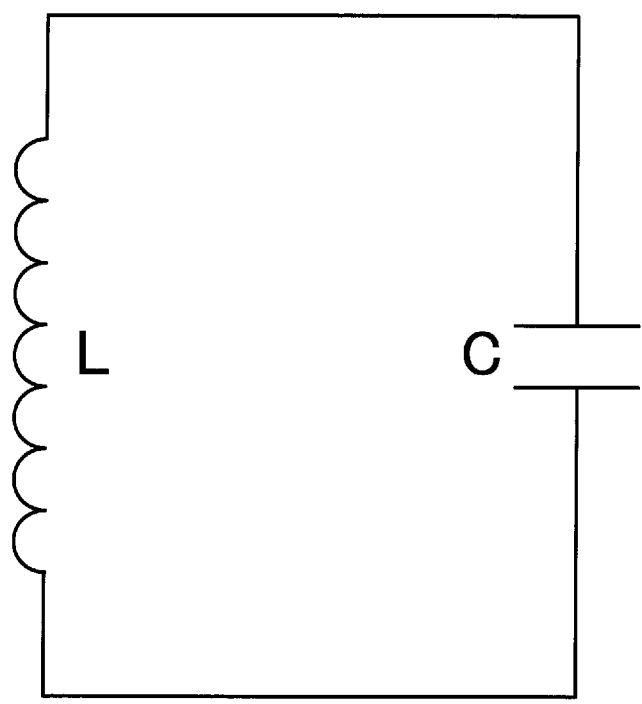
FIG. 2 is an equivalent circuit diagram illustrating an example of a resonance coil according to the first embodiment.

FIG. 2 is an equivalent circuit diagram illustrating an example of the resonance coil according to the first embodiment.

As illustrated in FIG. 2, the resonance coil 110, 210 configures an LC resonance circuit including the inductance L and the capacitance C. A resonance frequency f of the LC resonance circuit is expressed by Expression below.

$$f = \omega/2\Pi = 1/\{2\Pi(LC)^{1/2}\} \qquad (1)$$

Figure 3:
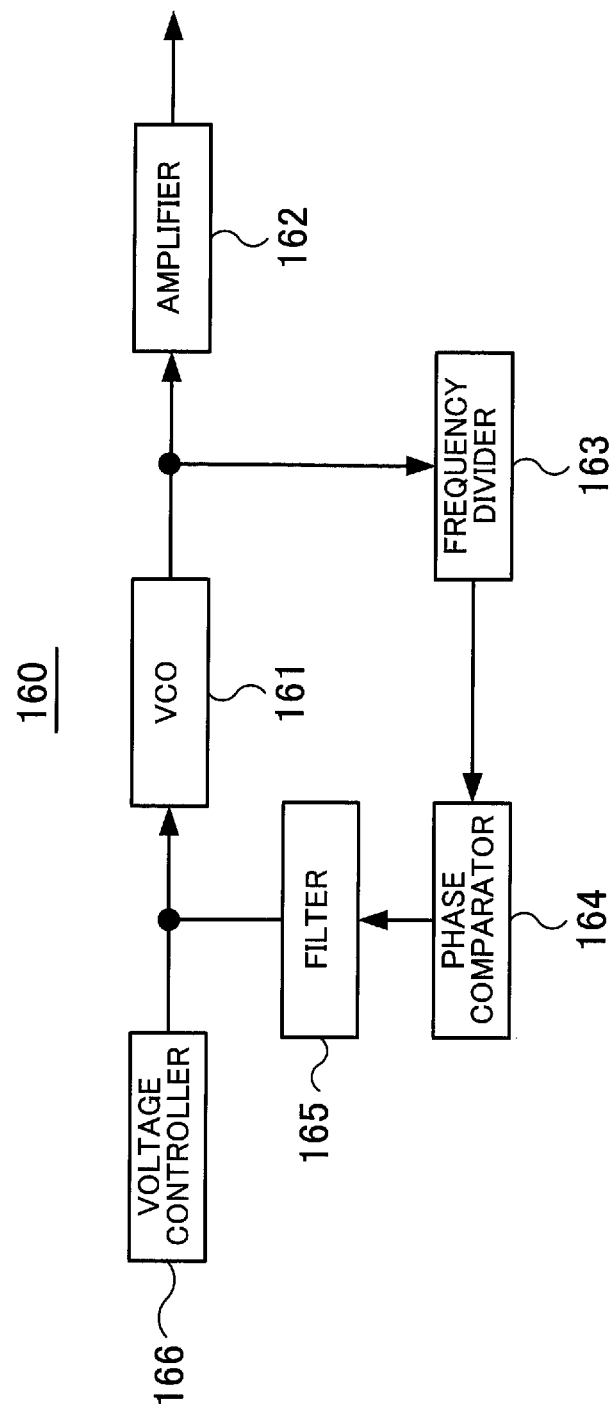
FIG. 3 illustrates a specific example of an alternating current power source and a frequency changer according to the first embodiment.

FIG. 3 illustrates a specific example of the alternating current power source and the frequency changer according to the first embodiment.

In this example, the alternating current power source 130 and the frequency changer 140 include a PLL (Phase Locked Loop) circuit 160.

The PLL circuit 160 has a voltage controlled oscillator (VCO) 161 configured to output an alternating current having an oscillation frequency according to an input voltage, an amplifier 162 configured to amplify an alternating current output from the voltage controlled oscillator 161 and output the amplified current to the coil 120, and a frequency divider 163 configured to frequency-divide an alternating current output from the voltage controlled oscillator 161.

Further, the PLL circuit 160 has a phase comparator 164 configured to compare the phase of an output signal of the frequency divider 163 with the phase of a reference signal and output a phase difference signal, a filter 165 configured to convert an output signal of the phase comparator 164 into a direct current signal and output the direct current signal to the voltage controlled oscillator 161, and a voltage controller 166 configured to control the voltage of a signal input to the voltage controlled oscillator 161 from the filter 165 based on communication data.

In the PLL circuit 160, the voltage controller 166 controls the voltage of a signal input to the voltage controlled oscillator 161 based on communication data, and thereby, the oscillation frequency of the alternating current output from the voltage controlled oscillator 161 changes, thus enabling modulation of the alternating current output from the amplifier 162 to the coil 120.

In the PLL circuit 160, the voltage controller 166 corresponds to the frequency changer 140 and the voltage controlled oscillator 161, the amplifier 162, the frequency divider 163, the phase comparator 164, and the filter 165 correspond to the alternating current power source 130.

Figure 4:
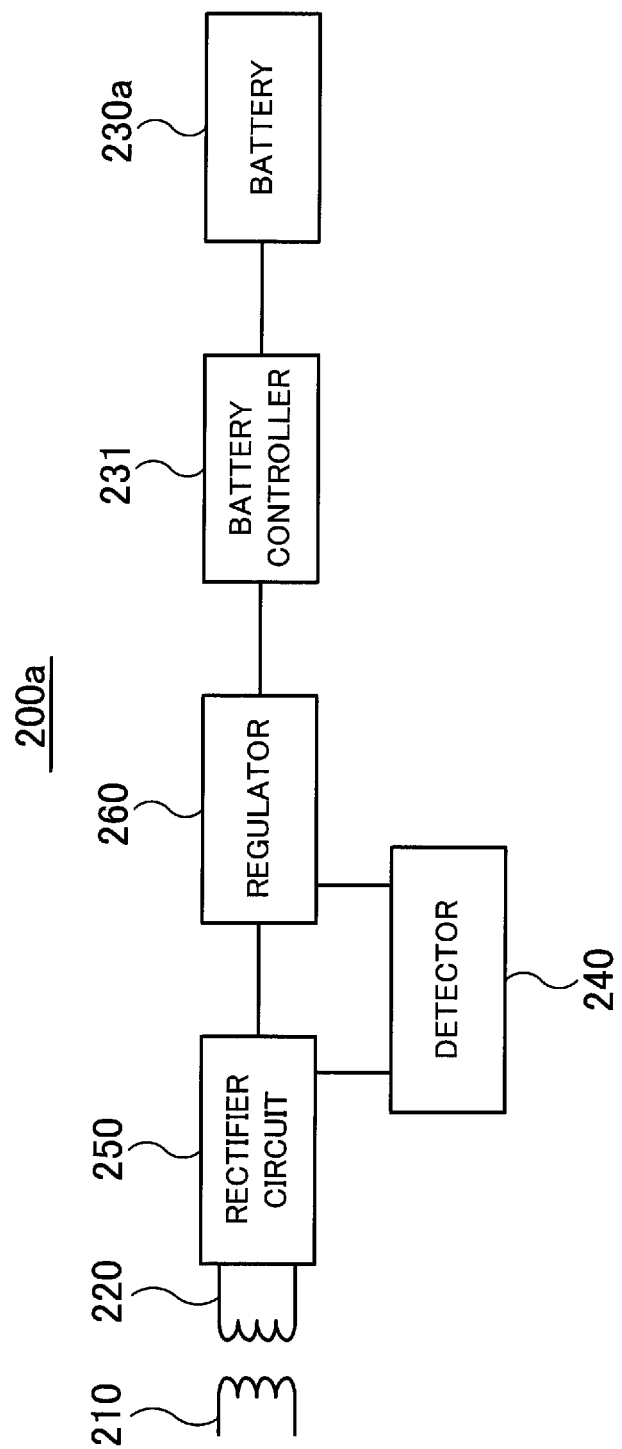
FIG. 4 illustrates a specific example of a magnetic resonance power receiver according to the first embodiment.

FIG. 4 illustrates a specific example of the magnetic resonance power receiver according to the first embodiment.

A magnetic resonance power receiver 200a has the resonance coil 210, the coil 220, a rectifier circuit 250, a regulator 260, a battery controller 231, a battery 230a, and the detector 240.

The rectifier circuit 250 converts the alternating current generated in the coil 220 into a direct current and outputs the direct current to the regulator 260. The regulator 260 makes the direct current input from the rectifier circuit 250 constant and outputs the constant current to the battery controller 231. The battery controller 231 accumulates power in the battery 230 by the constant current output from the regulator 260. The detector 240 compares the amount of power in accordance with the output current of the rectifier circuit 250 with the reference amount of power generated based on the constant output current of the regulator 260.

Figure 5:
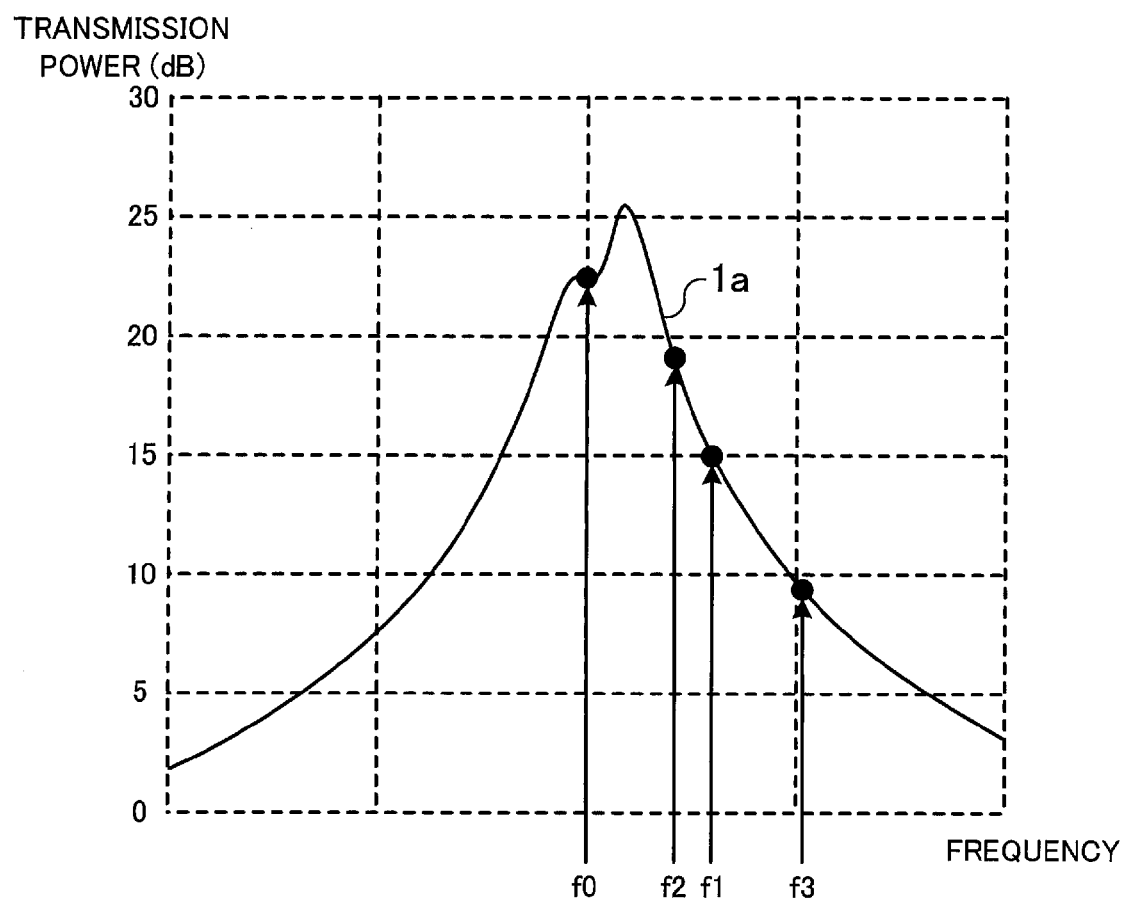
FIG. 5 is a graph illustrating an example of a power transmission state of a magnetic resonance wireless power transmission system according to the first embodiment.

FIG. 5 is a graph illustrating an example of a power transmission state of the magnetic resonance wireless power transmission system according to the first embodiment.

The horizontal axis of the graph represents the frequency of the alternating current generated by the alternating current power source 130 and the vertical axis represents the transmission power (dB). Here, the transmission power is power transmitted from the resonance coil 110 to the resonance coil 210.

A characteristic 1a represents the transmission power characteristic when the resonance frequency of the resonance coil 110 and the resonance coil 210 is f0. The transmission power takes a peak value when the frequency is f0. In the characteristic 1a, the vicinity of the peak value is distorted, which may be considered to be affected by conditions other than the resonance frequency.

Further, the transmission power characteristic has a steep characteristic having the value when the frequency is f0 as a peak value. The steep characteristic of the transmission power characteristic enables increase of a Q value indicating the efficiency of power transmission.

Furthermore, the steep characteristic of the transmission power characteristic considerably attenuates the transmission power, if the frequency deviates from f0. For example, when the frequency is f0, the transmission power is about 22 dB, when f1, about 15 dB, when f2, about 18 dB, and when f3, about 10 dB.

Due to such a characteristic, when the frequency changer 140 modulates the frequency of the alternating current generated by the alternating current power source 130 at the time of communication, the magnitude of power transmitted from the resonance coil 110 changes considerably. Hence, it is made possible to transmit the modulated signal of the amount of power with the large amount of change from the resonance coil 110 to the resonance coil 210.

Figure 6:
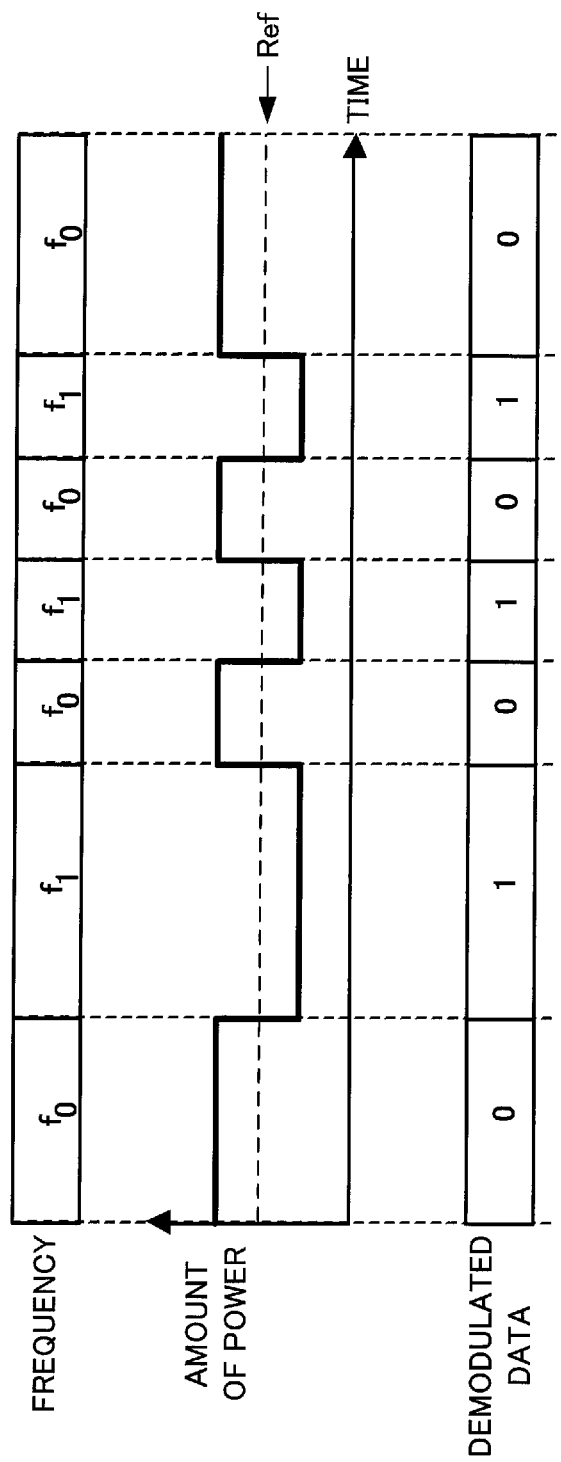
FIG. 6 is a timing chart illustrating an example of data transmission of the magnetic resonance wireless power transmission system according to the first embodiment.
Figure 7:
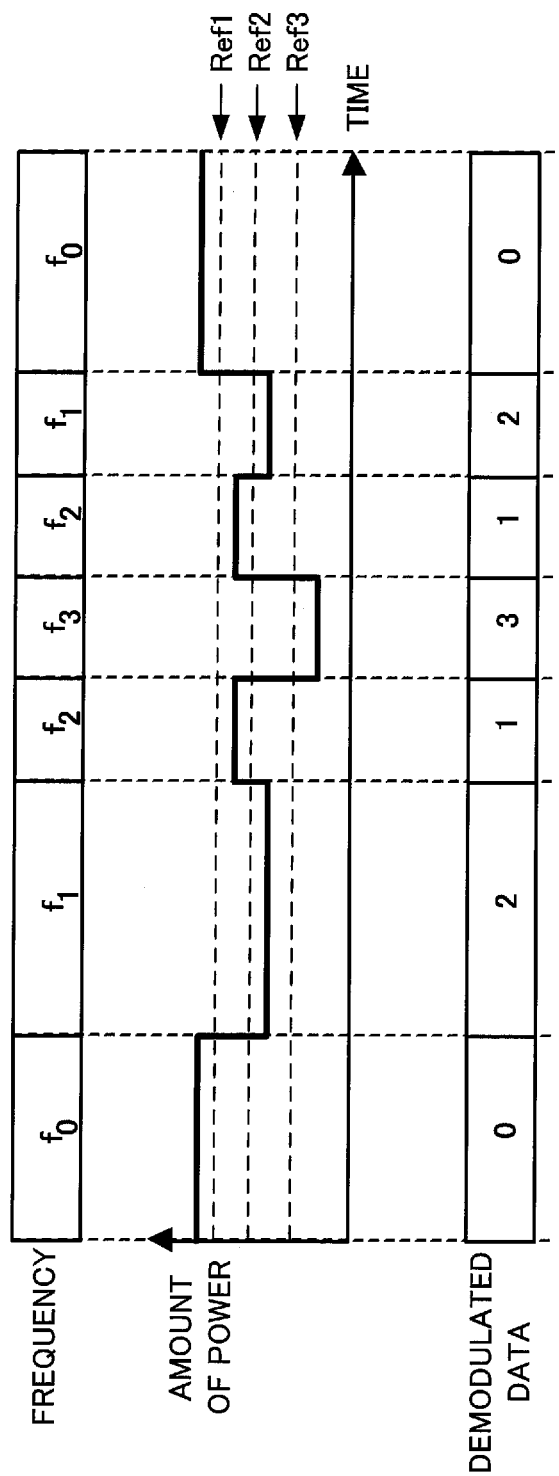
FIG. 7 is a timing chart illustrating an example of data transmission of the magnetic resonance wireless power transmission system according to the first embodiment.

FIG. 6 and FIG. 7 are each a timing chart illustrating an example of data transmission of the magnetic resonance wireless power transmission system according to the first embodiment.

FIG. 6 illustrates the way the frequency of the alternating current generated by the alternating current power source 130, the amount of power detected by the detector 240, and the demodulated data generated by the detector 240 change.

Here, the resonance frequency of the resonance coil 110 and the resonance coil 210 is f0. It is assumed that the frequencies f0 and f1 correspond to the frequencies f0 and f1 in FIG. 5.

In this example, the frequency changer 140 changes the frequency of the alternating current generated by the alternating current power source 130 to f0 and f1 based on communication data at the time of communication. To the detector 240, a reference amount of power Ref is supplied.

When the frequency is f0, the amount of power detected by the detector 240 is larger than the reference amount of power Ref and the detector 240 generates "0" as demodulated data. Further, when the frequency is f1, the amount of power detected by the detector 240 is smaller than the reference amount of power Ref and the detector 240 generates "1" as modulated data.

As described above, the frequency changer 140 changes the frequency of the alternating current generated by the alternating current power source 130 to f0 and f1 based on communication data, thus enabling the detector 240 to generate 1-bit demodulated data.

FIG. 7 illustrates the way the frequency of the alternating current generated by the alternating current power source 130, the amount of power detected by the detector 240, and the modulated data generated by the detector 240 change.

Here, the resonance frequency of the resonance coil 110 and the resonance coil 210 is f0. It is assumed that the frequencies f0, f1, f2, and f3 correspond to the frequencies f0, f1, f2, and f3 in FIG. 5, respectively.

In this example, the frequency changer 140 changes the frequency of the alternating current generated by the alternating current power source 130 to f0, f1, f2, and f3 based on communication data at the time of communication. Further, to the detector 240, reference amounts of power Ref 1, Ref 2, and Ref 3 are supplied, respectively.

When the frequency is f0, the amount of power detected by the detector 240 is larger than the reference amount of power Ref 1 and the detector 240 generates "0" as demodulated data. When the frequency is f1, the amount of power detected by the detector 240 is between the reference amounts of power Ref 2 and Ref 3 and the detector 240 generates "2" as demodulated data.

When the frequency is f2, the amount of power detected by the detector 240 is between the reference amounts of power Ref 1 and Ref 2 and the detector 240 generates "1" as demodulated data. When the frequency is f3, the amount of power detected by the detector 240 is smaller than the reference amount of power Ref 3 and the detector 240 generates "3" as demodulated data.

The frequency changer 140 changes the frequency of the alternating current generated by the alternating current power source 130 to f0 to f3 based on communication data as described above, thus enabling the detector 240 to generate 2-bit demodulated data. The frequency values changed by the frequency changer 140 are not limited to the four values of f0 to f3 and may be greater.

As explained above, in the magnetic resonance wireless power transmission system 10, it is made possible to perform data communication using the configuration for performing power transmission by magnetic resonance, that is, the resonance coil 110 and the resonance coil 210 without providing a new communication module. Hence, it is made possible to reduce the costs of the magnetic resonance power transmitter 100 and the magnetic resonance power receiver 200 having the communication function.

In the first embodiment, the frequency of the alternating current generated by the alternating current power source 130 is modulated, but it may also be possible to modulate the amplitude of the alternating current generated by the alternating current power source 130 instead.

Next, an embodiment that differs from the first embodiment in the method for modulating communication data is explained as a second embodiment.

(Second Embodiment)

Figure 8:
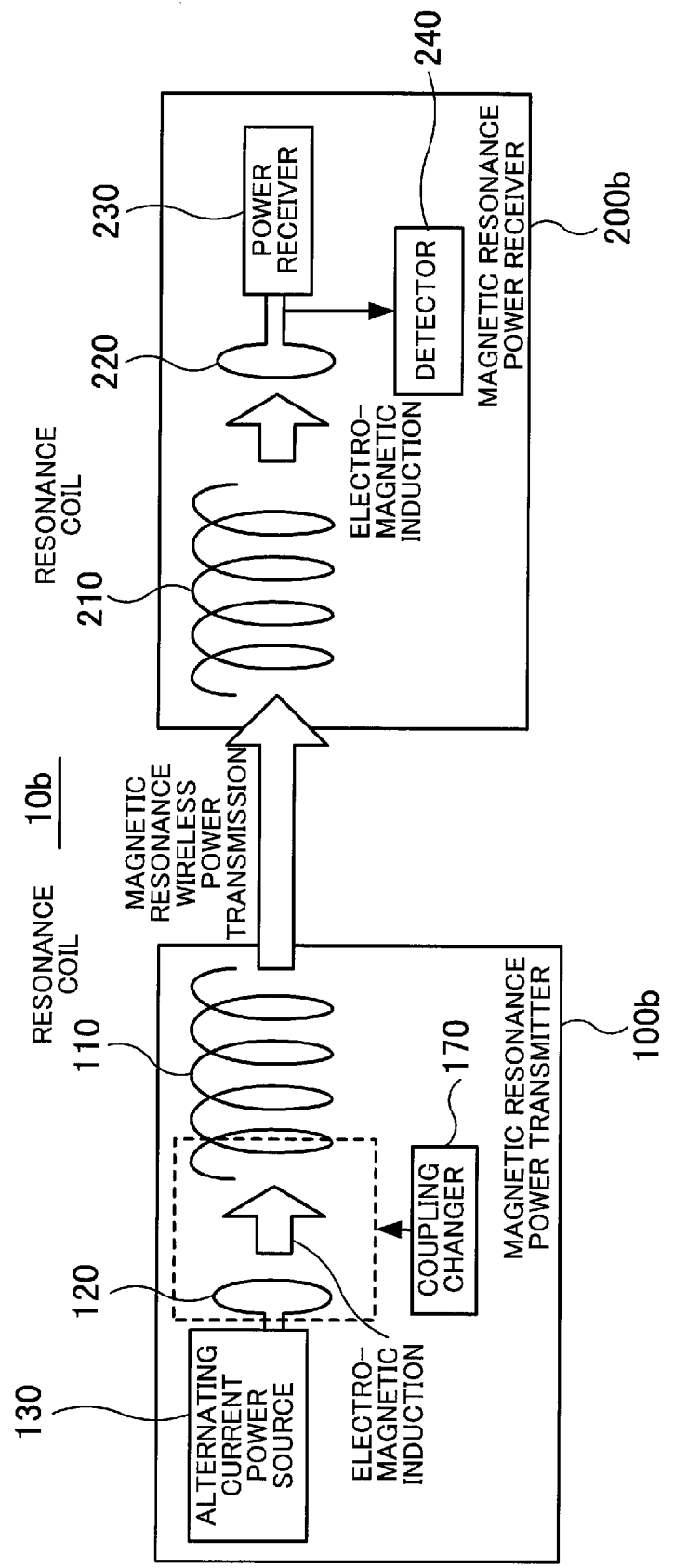
FIG. 8 illustrates an example of a magnetic resonance wireless power transmission system according to a second embodiment.

FIG. 8 illustrates an example of a magnetic resonance wireless power transmission system according to the second embodiment.

A magnetic resonance wireless power transmission system 10b has a magnetic resonance power transmitter 100b and a magnetic resonance power receiver 200b. The magnetic resonance power transmitter 100b is the same as the magnetic resonance power transmitter 100 in the first embodiment except that a coupling changer 170 is provided in place of the frequency changer 140. The magnetic resonance power receiver 200b is the same as the magnetic resonance power receiver 200 in the first embodiment.

The coupling changer 170 changes a coupling state by electromagnetic induction between the resonance coil 110 and the coil 120 based on communication data when the magnetic resonance power transmitter 100b and the magnetic resonance power receiver 200b perform communication.

When the coupling state by electromagnetic induction between the resonance coil 110 and the coil 120 changes, the amount of power supplied from the coil 120 to the resonance coil 110 also changes. Consequently, the amount of power transmitted by the resonance coil 110 also changes.

That is, the coupling changer 170 changes the coupling state by electromagnetic induction between the resonance coil 110 and the coil 120 based on communication data, thereby enabling modulation of the amount of power transmitted by the resonance coil 110.

In this manner, as in the first embodiment, wireless communication of data is performed from the magnetic resonance power transmitter 100b to the magnetic resonance power receiver 200b.

FIGS. 9A to 9D illustrate an example of a configuration for changing coupling by electromagnetic induction according to the second embodiment.

Figure 9A:
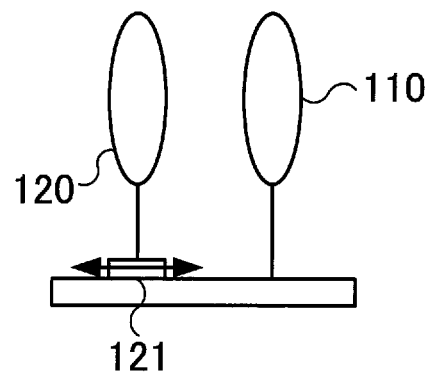
FIGS. 9A to 9D illustrate an example of a configuration to change coupling by electromagnetic induction according to the second embodiment.

The example illustrated in FIG. 9A illustrates a configuration in which the distance between the resonance coil 110 and the coil 120 is made variable. In this example, the coil 120 is provided with a moving mechanism 121 and the coupling changer 170 moves the moving mechanism 121, which makes the distance between the resonance coil 110 and the coil 120 variable. When the distance between the resonance coil 110 and the coil 120 is changed, the coupling state by electromagnetic induction changes and the amount of power supplied from the coil 120 to the resonance coil 110 changes. For example, when the distance is increased, the amount of power supplied from the coil 120 to the resonance coil 110 is reduced.

Figure 9B:
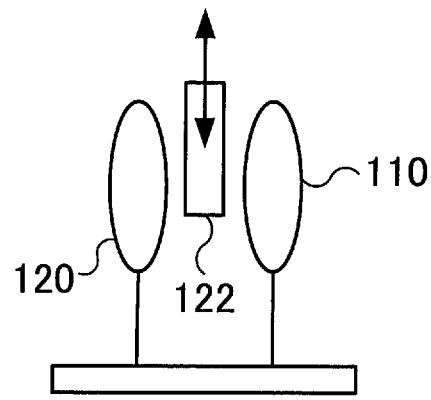

The example illustrated in FIG. 9B has a movable magnetic body 122 inserted between the resonance coil 110 and the coil 120. In this example, the coupling changer 170 moves the magnetic body 122 to change the arrangement position thereof. When the arrangement position of the magnetic body 122 is changed, the coupling state by electromagnetic induction changes and the amount of power supplied from the coil 120 to the resonance coil 110 changes.

Figure 9C:
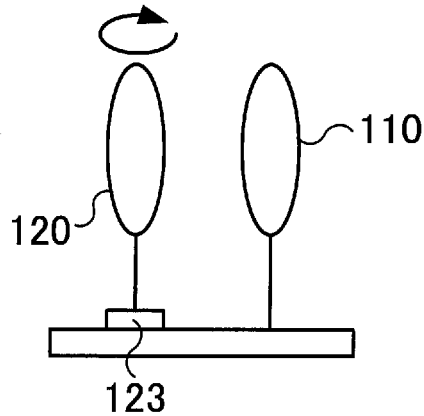

The example illustrated in FIG. 9C has a configuration in which the orientation of the coil 120 with respect to the resonance coil 110 is made variable. In this example, the coil 120 is provided with a rotating mechanism 123 and rotation of the rotating mechanism 123 by the coupling changer 170 makes variable the angle of the coil 120 with respect to the resonance coil 110. When the angle of the coil 120 with respect to the resonance coil 110 is changed, the coupling state by electromagnetic induction changes and the amount of power supplied from the coil 120 to the resonance coil 110 changes.

Figure 9D:
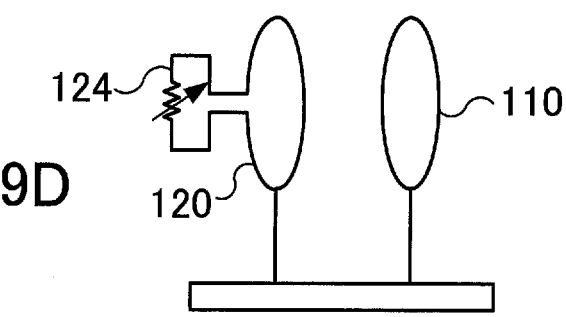

The example illustrated in FIG. 9D has a variable resistor 124 loaded on the coil 120. In this example, when the resistance value of the variable resistor 124 is changed by the coupling changer 170, the coupling state by electromagnetic induction changes and the amount of power supplied from the coil 120 to the resonance coil 110 changes.

In addition to the above, it is also possible to change the coupling state by electromagnetic induction by changing the ratio of the numbers of windings of coil wires between the resonance coil 110 and the 120 or the ratio of sizes.

Next, FIG. 10 and FIG. 11 are each a timing chart illustrating an example of data transmission in the magnetic resonance wireless power transmission system according to the second embodiment.

This timing chart corresponds to the example in which when the coupling changer 170 changes the distance between the resonance coil 110 and the coil 120 as illustrated in FIG. 9A, coupling by electromagnetic induction is changed.

FIG. 10 illustrates the way a distance d between the resonance coil 110 and the coil 120, the amount of power detected by the detector 240, and demodulated data generated by the detector 240 change.

In this example, the coupling changer 170 changes the distance d between the resonance coil 110 and the coil 120 to d0 and d1 (d0<d1) based on communication data at the time of communication. To the detector 240, the reference amount of power Ref is supplied.

When the distance d is d0, the amount of power detected by the detector 240 is larger than the reference amount of power Ref and the detector 240 generates "0" as demodulated data. When the distance d is d1, the amount of power detected by the detector 240 is smaller than the reference amount of power Ref and the detector 240 generates "1" as demodulated data.

As described above, the coupling changer 170 changes the distance d between the resonance coil 110 and the coil 120 to d0 and d1 based on communication data, thereby enabling the detector 240 to generate 1-bit demodulated data.

FIG. 11 illustrates the way the distance d between the resonance coil 110 and the coil 120, the amount of power detected by the detector 240, and the demodulated data generated by the detector 240 change.

In this example, the coupling changer 170 changes the distance d between the resonance coil 110 and the coil 120 to d0, d1, d2, and d3 (d0<d1<d2<d3) based on communication data at the time of communication. To the detector 240, the reference amounts of power Ref1, Ref2, and Ref3 are supplied.

When the distance d is d0, the amount of power detected by the detector 240 is larger than the reference amount of power Ref1 and the detector 240 generates "0" as demodulated data. When the distance d is d2, the amount of power detected by the detector 240 is between the reference amounts of power Ref2 and Ref3 and the detector 240 generates "2" as demodulated data.

When the distance d is d1, the amount of power detected by the detector 240 is between the reference amounts of Ref1 and Ref2 and the detector 240 generates "1" as demodulated data. When the distance d is d3, the amount of power detected by the detector 240 is smaller than the reference amount of power Ref3 and the detector 240 generates "3" as demodulated data.

As described above, the coupling changer 170 changes the distance d between the resonance coil 110 and the coil 120 to d0 to d3 based on communication data, thereby enabling the detector 240 to generate 2-bit demodulated data. The values to which the distance d is changed by the coupling changer 170 are not limited to the four values of d0 to d3 described above and may be greater.

As explained above, in the magnetic resonance wireless power transmission system 10b, it is made possible to perform data communication without providing a new communication module etc., which makes it possible to reduce the costs of the magnetic resonance power transmitter 100b and the magnetic resonance power receiver 200b having the communication function.

Next, an embodiment that combines the method for modulating communication data in the first embodiment and the method for modulating communication data in the second embodiment is explained as a third embodiment.

(Third Embodiment)

Figure 12:
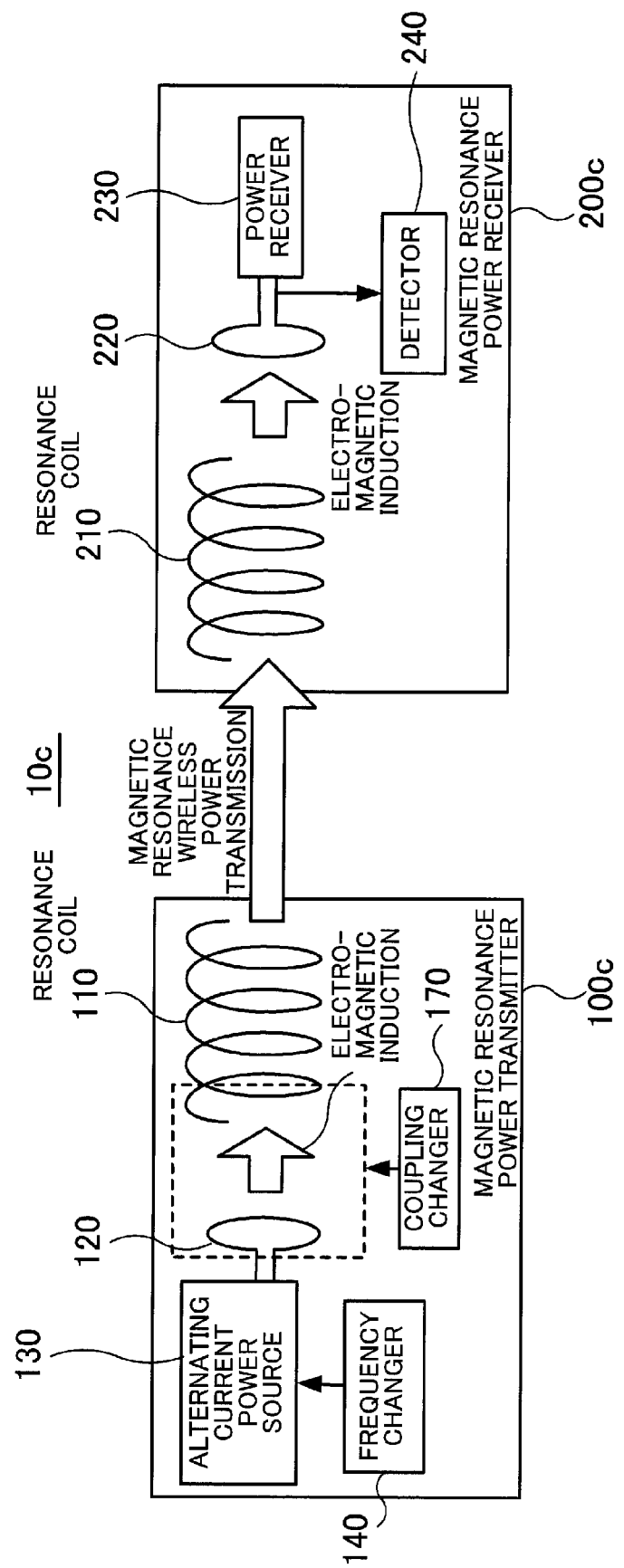
FIG. 12 illustrates an example of a magnetic resonance wireless power transmission system according to a third embodiment.

FIG. 12 illustrates an example of a magnetic resonance wireless power transmission system according to the third embodiment.

A magnetic resonance wireless power transmission system 10c has a magnetic resonance power transmitter 100c and a magnetic resonance power receiver 200c. The magnetic resonance power transmitter 100c is the same as the magnetic resonance power transmitter 100 in the first embodiment except that the coupling changer 170 is provided. The magnetic resonance power receiver 200c is the same as the magnetic resonance power receiver 200 in the first embodiment.

Figure 13:
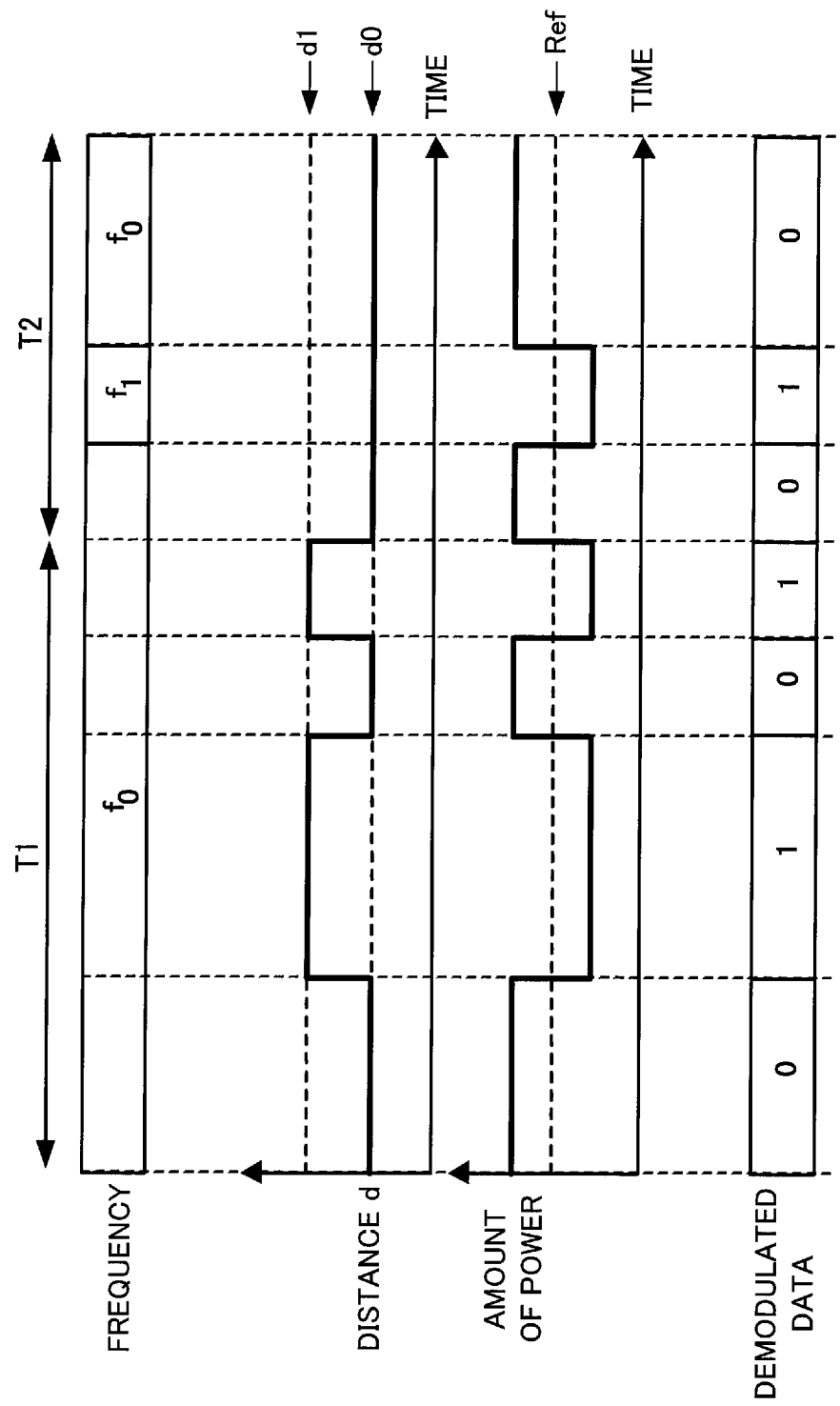
FIG. 13 is a timing chart illustrating an example of data transmission of the magnetic resonance wireless power transmission system according to the third embodiment.

FIG. 13 is a timing chart illustrating an example of data transmission of the magnetic resonance wireless power transmission system according to the third embodiment.

FIG. 13 illustrates the way the frequency of an alternating current generated by the alternating current power source 130, the distance d between the resonance coil 110 and the coil 120, the amount of power detected by the detector 240, and the demodulated data generated by the detector 240 change.

In this example, the coupling changer 170 changes the distance d between the resonance coil 110 and the coil 120 to d0 and d1 (d0<d1) based on communication data during a period T1 at the time of communication.

During the period T1, the frequency changer 140 maintains the frequency of the alternating current generated by the alternating current power source 130 at f0.

Further, during a period T2, the frequency changer 140 changes the frequency of the alternating current generated by the alternating current power source 130 to f0 and f1 based on communication data. During the period T2, the coupling changer 170 maintains the distance d between the resonance coil 110 and the coil 120 at d0.

During the period T1, when the distance d is d0, the amount of power detected by the detector 240 is larger than the reference amount of power Ref and the detector 240 generates "0" as demodulated data. When the distance d is d1, the amount of power detected by the detector 240 is smaller than the reference amount of power Ref and the detector 240 generates "1" as demodulated data.

During the period T2, when the frequency is f0, the amount of power detected by the detector 240 is larger than the reference amount of power Ref and the detector 240 generates "0" as demodulated data. When the frequency is f1, the amount of power detected by the detector 240 is smaller than the reference amount of power Ref and the detector 240 generates "1" as demodulated data.

As described above, it is also possible to communicate data by combining the method for changing the frequency of the alternating current generated by the alternating current power source 130 and the method for changing the coupling state by electromagnetic induction between the resonance coil 110 and the coil 120.

The first to third embodiments relate to transmission of data from the magnetic resonance power transmitter to the magnetic resonance power receiver, and next, an embodiment relating to transmission of data from a magnetic resonance power receiver to a magnetic resonance power transmitter is explained as a fourth embodiment.

(Fourth Embodiment)

Figure 14:
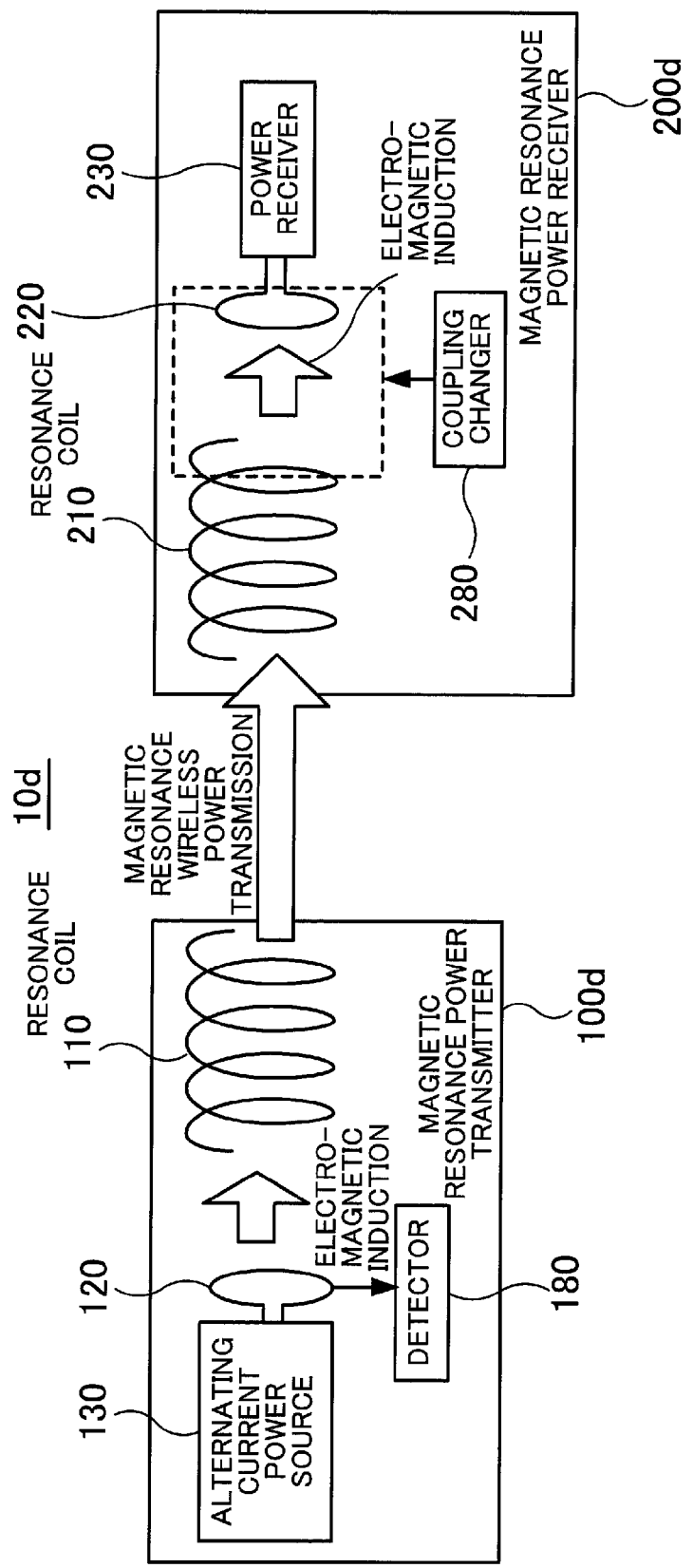
FIG. 14 illustrates an example of a magnetic resonance wireless power transmission system according to a fourth embodiment.

FIG. 14 illustrates an example of a magnetic resonance wireless power transmission system according to the fourth embodiment.

A magnetic resonance wireless power transmission system 10d has a magnetic resonance power transmitter 100d and a magnetic resonance power receiver 200d.

The magnetic resonance power transmitter 100d has the resonance coil 110, the coil 120, the alternating current power source 130, and a detector 180 configured to detect an amount of power generated in the coil 120.

The magnetic resonance power receiver 200d has the resonance coil 210, the coil 220, the power receiver 230, and a coupling changer 280.

The coupling changer 280 changes the coupling state by electromagnetic induction between the resonance coil 210 and the coil 220 based on communication data when the magnetic resonance power transmitter 100d and the magnetic resonance power receiver 200d perform communication.

As a method for changing the coupling state by electromagnetic induction between the resonance coil 210 and the coil 220, for example, it is possible to apply the method explained using FIGS. 9A to 9D.

When the coupling state by electromagnetic induction between the resonance coil 210 and the coil 220 changes, the amount of power supplied from the resonance coil 210 to the coil 220 changes. Accordingly, the amount of power transmitted from the resonance coil 110 to the resonance coil 210 changes.

That is, the coupling changer 280 changes the coupling state by electromagnetic induction between the resonance coil 210 and the coil 220 based on communication data, thereby enabling modulation of the amount of power transmitted from the resonance coil 110 to the resonance coil 210. That is, communication data is transmitted as a modulated signal of the amount of power from the resonance coil 210 to the resonance coil 110.

When the amount of power transmitted from the resonance coil 110 to the resonance coil 210 changes, the amount of power supplied from the coil 120 to the resonance coil 110 also changes and thereby, the amount of power generated in the coil 120 also changes. That is, the modulated signal of the amount of power transmitted to the resonance coil 110 is propagated to the coil 120.

The detector 180 generates demodulated data including 1-bit data or 2-bit data by detecting the modulated signal of the amount of power propagated to the coil 120 and by comparing the detected modulated signal with the reference amount of power at the time of communication.

As described above, in the magnetic resonance wireless power transmission system 10d, the coupling changer 280 changes the coupling state by electromagnetic induction between the resonance coil 210 and the coil 220 based on communication data, and thus the modulated signal of the amount of power is transmitted from the resonance coil 210 to the resonance coil 110. The modulated signal of the amount of power transmitted to the resonance coil 110 is demodulated by the detector 180 and demodulated data is generated. In this manner, wireless communication of data from the magnetic resonance power receiver 200d to the magnetic resonance power transmitter 100d is performed.

Figure 15:
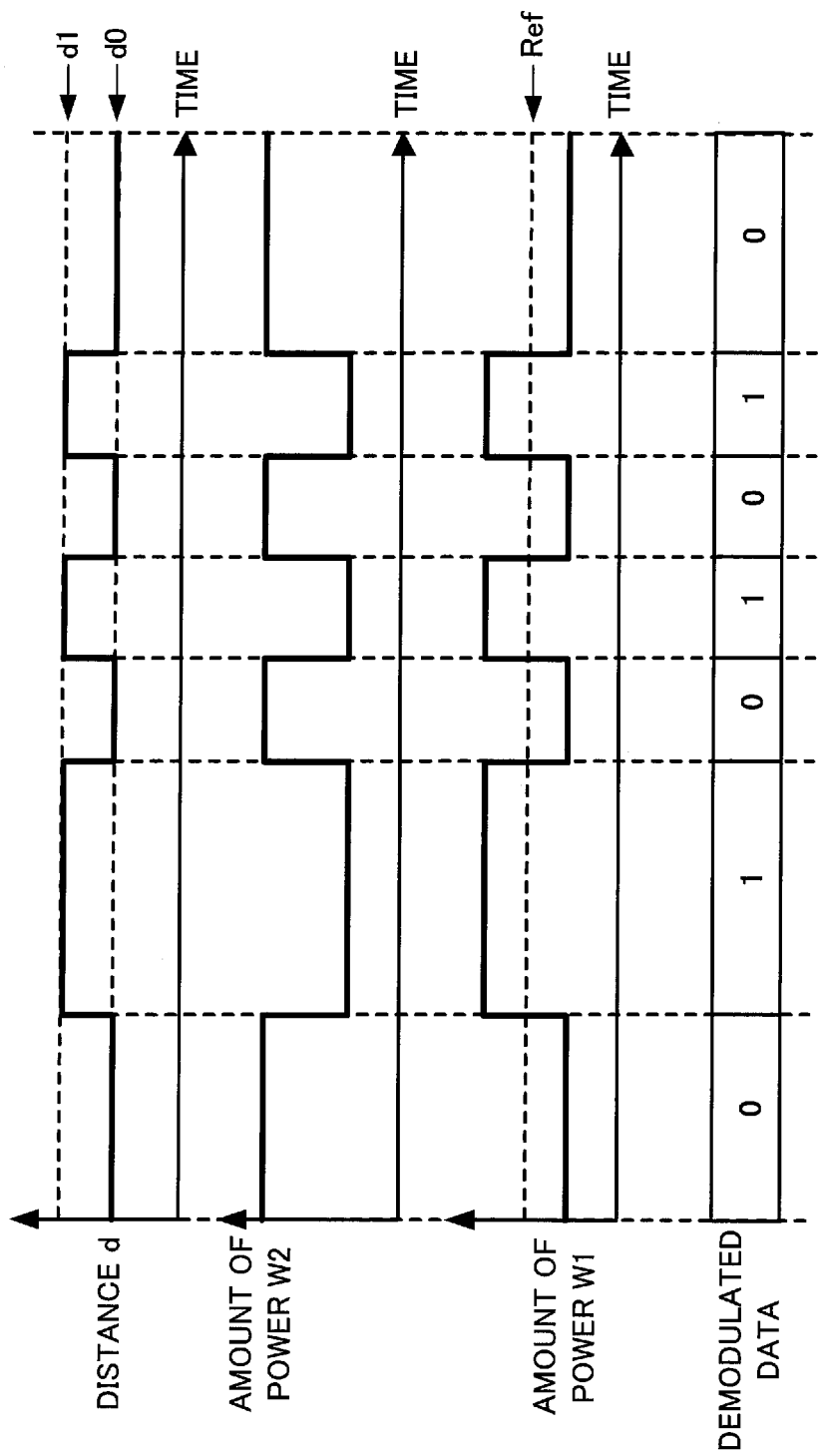
FIG. 15 is a timing chart illustrating an example of data transmission of the magnetic resonance wireless power transmission system according to the fourth embodiment.
Figure 16:
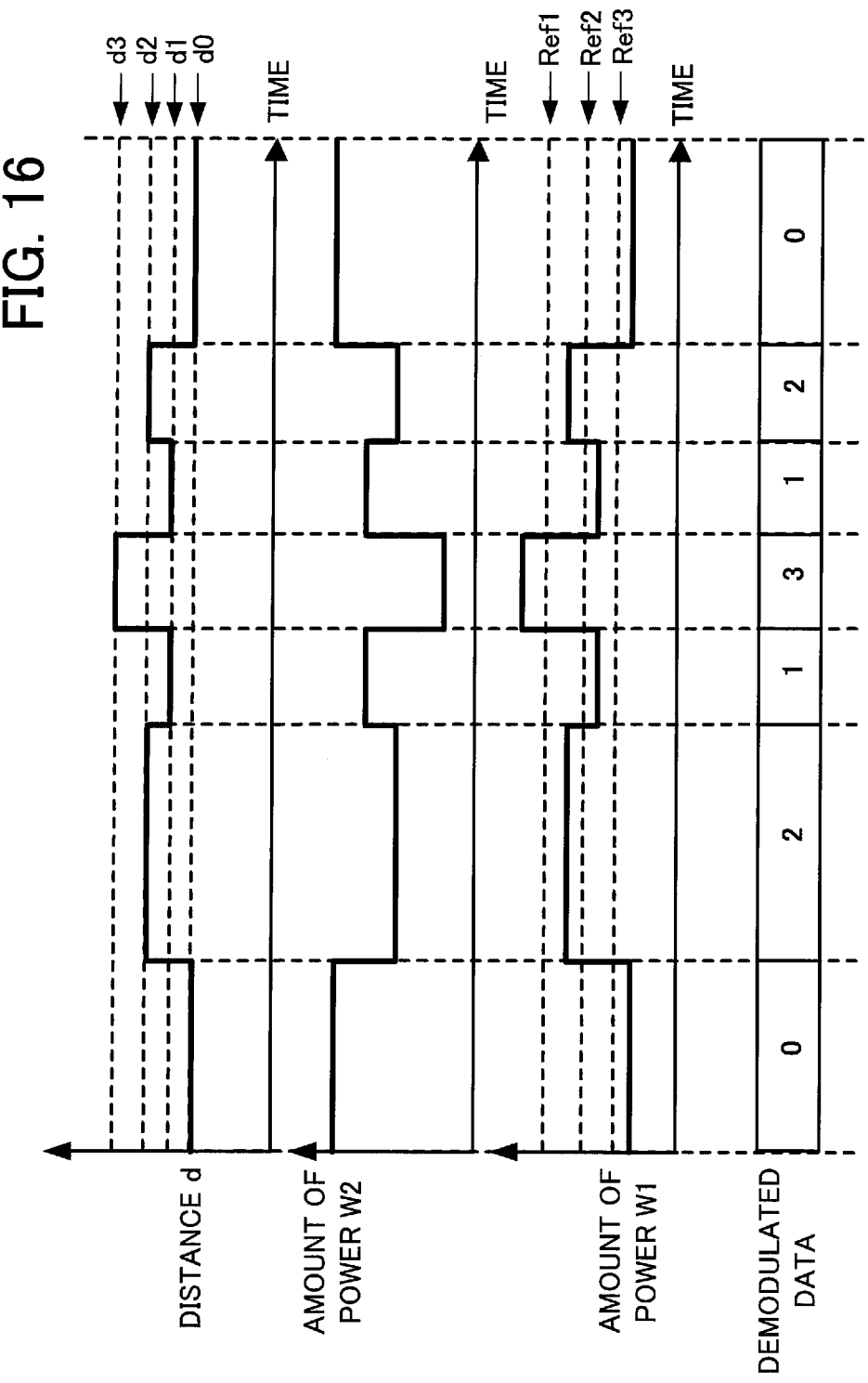
FIG. 16 is a timing chart illustrating an example of data transmission of the magnetic resonance wireless power transmission system according to the fourth embodiment.

Next, FIG. 15 and FIG. 16 are each a timing chart illustrating an example of data transmission of the magnetic resonance wireless power transmission system according to the fourth embodiment.

This timing chart corresponds to the example in which the coupling changer 280 changes the coupling by electromagnetic induction by changing the distance between the resonance coil 210 and the coil 220.

FIG. 15 illustrates the way the distance d between the resonance coil 210 and the coil 220, an amount of power W2 supplied to the coil 220, an amount of power W1 detected by the detector 180, and the demodulated data generated by the detector 180 change.

In this example, the coupling changer 280 changes the distance d between the resonance coil 210 and the coil 220 to d0 and d1 (d0<d1) based on communication data at the time of communication. To the detector 180, the reference amount of power Ref is supplied.

When the distance d is d0, the amount of power W1 is smaller than the reference amount of power Ref and the detector 180 generates "0" as demodulated data. When the distance d is d1, the amount of power W1 is larger than the reference amount of power Ref and the detector 180 generates "1" as demodulated data.

As described above, the coupling changer 280 changes the distance d between the resonance coil 210 and the coil 220 to d0 and d1 based on communication data, thus enabling the detector 180 to generate 1-bit demodulated data.

FIG. 16 illustrates the way the distance d between the resonance coil 210 and the coil 220, the amount of power W2 supplied to the coil 220, the amount of power W1 detected by the detector 180, and the demodulated data generated by the detector 180 change.

In this example, the coupling changer 280 changes the distance d between the resonance coil 210 and the coil 220 to d0, d1, d2, and d3 (d0<d1<d2<d3) based on communication data at the time of communication. To the detector 180, the reference amounts of power Ref1, Ref2, and Ref3 are supplied.

When the distance d is d0, the amount of power W1 is smaller than the reference amount of power Ref3 and the detector 180 generates "0" as demodulated data. When the distance d is d2, the amount of power W1 is between the reference amounts of power Ref1 and Ref2 and the detector 180 generates "2" as demodulated data.

When the distance d is d1, the amount of power W1 is between the reference amounts of power Ref2 and Ref3 and the detector 180 generates "1" as demodulated data. When the distance d is d3, the amount of power W1 is larger than the reference amount of power Ref1 and the detector 180 generates "3" as demodulated data.

As described above, the coupling changer 280 changes the distance d between the resonance coil 210 and the coil 220 to d0 to d3 based on communication data, thus enabling the detector 180 to generate 2-bit demodulated data. The values to which the distance d is changed by the coupling changer 280 are not limited to the four values of d0 to d3 described above and may be greater.

As explained above, in the magnetic resonance wireless power transmission system 10d, it is made possible to perform data communication without providing a new communication module etc., which enables reduction of the costs of the magnetic resonance power transmitter 100d and the magnetic resonance power receiver 200d having the communication function.

Next, an embodiment that differs from the fourth embodiment in the method for modulating communication data is explained as a fifth embodiment.

(Fifth Embodiment)

Figure 17:
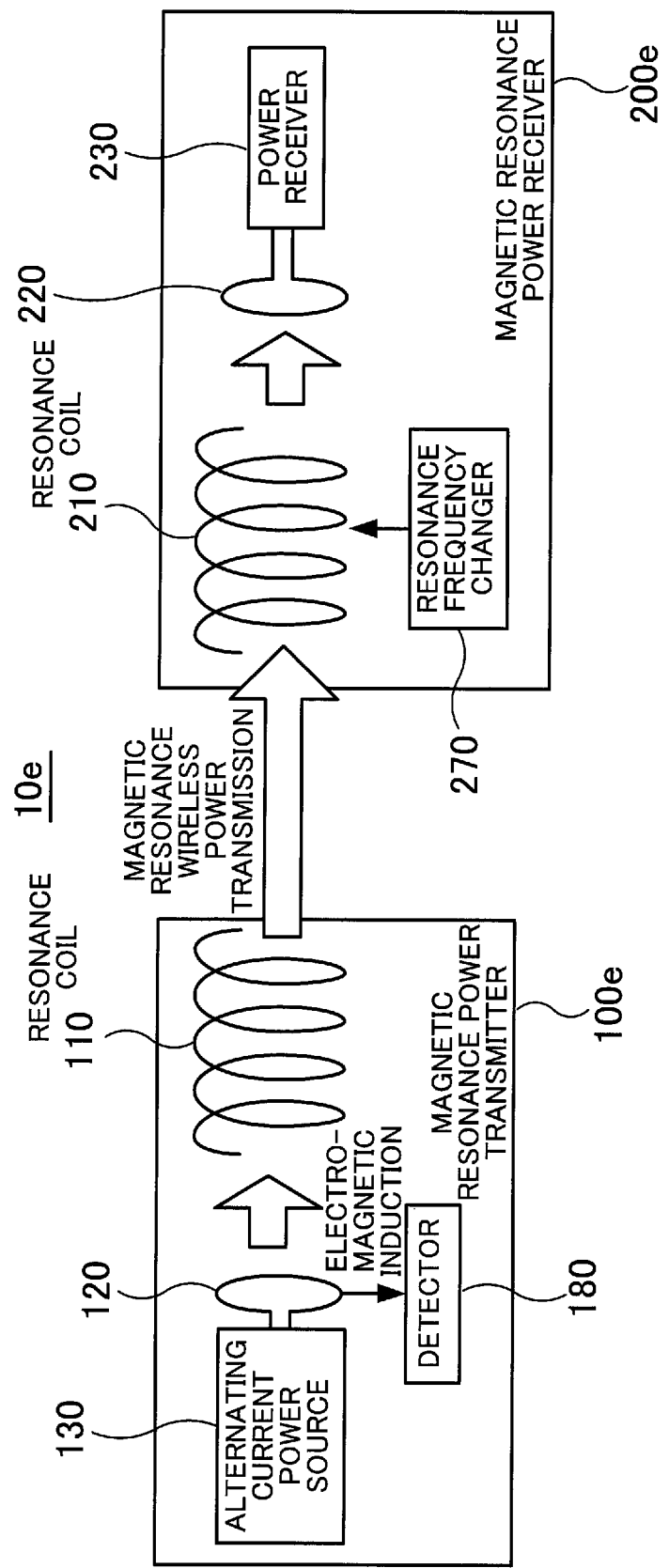
FIG. 17 illustrates an example of a magnetic resonance wireless power transmission system according to a fifth embodiment.

FIG. 17 illustrates an example of a magnetic resonance wireless power transmission system according to the fifth embodiment.

A magnetic resonance wireless power transmission system 10e has a magnetic resonance power transmitter 100e and a magnetic resonance power receiver 200e. The magnetic resonance power transmitter 100e is the same as the magnetic resonance power transmitter 100d in the fourth embodiment. The magnetic resonance power receiver 200e is the same as the magnetic resonance power receiver 200d in the fourth embodiment except that a resonance frequency changer 270 is provided in place of the coupling changer 280.

The resonance frequency changer 270 changes the resonance frequency of the resonance coil 210 based on communication data when the magnetic resonance power transmitter 100e and the magnetic resonance power receiver 200e perform communication. The resonance frequency of the resonance coil 210 is changed by, for example, changing the capacitance C of the resonance coil 210.

When the resonance frequency of the resonance coil 210 changes, the amount of power transmitted from the resonance coil 110 to the resonance coil 210 also changes.

That is, the resonance frequency changer 270 changes the resonance frequency of the resonance coil 210 based on communication data, thus enabling modulation of the amount of power transmitted from the resonance coil 110 to the resonance coil 210.

In this manner, as in the fourth embodiment, wireless communication of data from the magnetic resonance power receiver 200e to the magnetic resonance power transmitter 100e is performed.

Figure 18:
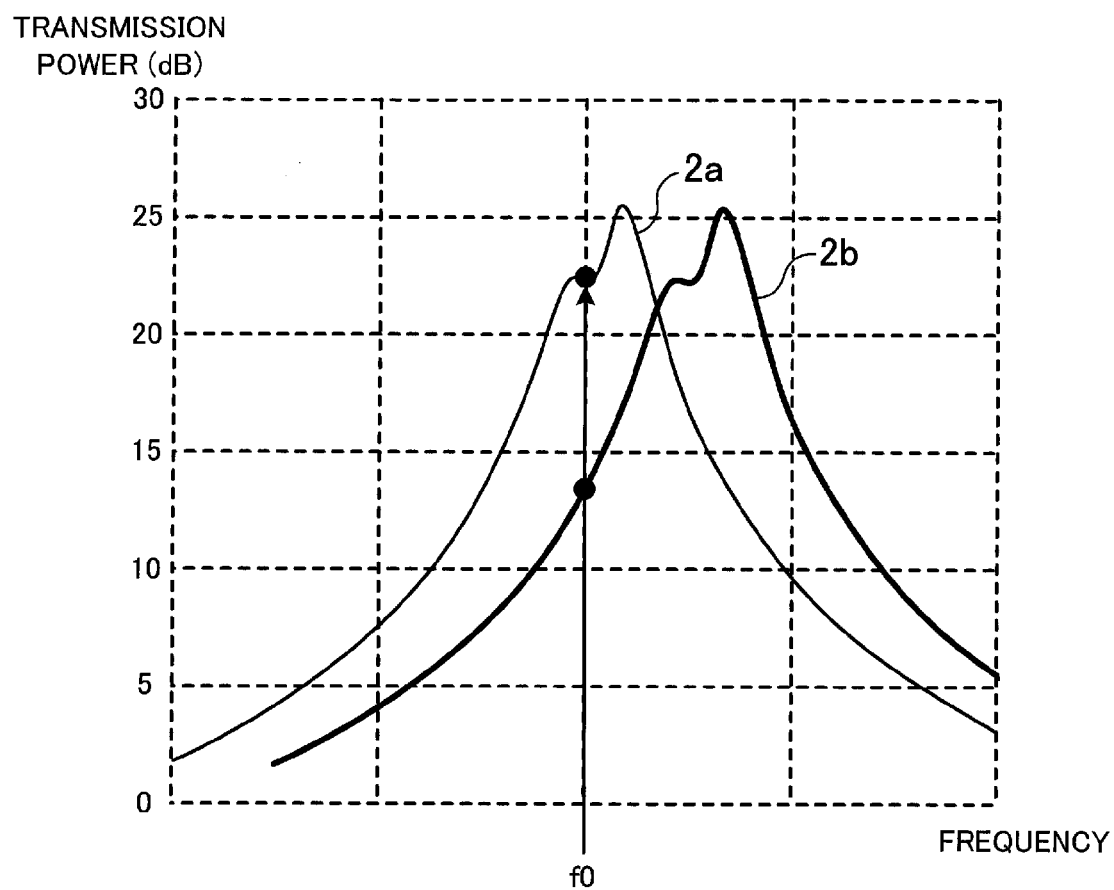
FIG. 18 is a graph illustrating an example of a power transmission state of the magnetic resonance wireless power transmission system according to the fifth embodiment.

FIG. 18 is a graph illustrating an example of the power transmission state of the magnetic resonance wireless power transmission system according to the fifth embodiment.

The horizontal axis of the graph represents the frequency of an alternating current generated by the alternating current power source 130 and the vertical axis, the transmission power (dB).

A characteristic 2a illustrates the transmission power characteristic when the resonance frequency of the resonance coil 210 agrees with the target frequency f0. In the characteristic 2a, the transmission power takes a peak value when the frequency is f0. In the characteristic 2a, the vicinity of the peak value is distorted, which can be considered to be affected by conditions other than the resonance frequency.

A characteristic 2b illustrates the transmission power characteristic when the resonance frequency of the resonance coil 210 deviates from f0. The characteristic 2b is in the state of being shifted in the horizontal axis direction with respect to the characteristic 2a and the transmission power when the frequency is f0 is reduced considerably compared to the transmission power in the case of the characteristic 2a.

As described above, changing the resonance frequency of the resonance coil 210 makes it possible to change the amount of power transmitted from the resonance coil 110 to the resonance coil 210.

Next, FIG. 19 and FIG. 20 are each a timing chart illustrating an example of data transmission of the magnetic resonance wireless power transmission system according to the fifth embodiment.

This timing chart corresponds to the example in which the resonance frequency changer 270 changes the capacitance C of the resonance coil 210.

FIG. 19 illustrates the way the capacitance C of the resonance coil 210, the amount of power W2 supplied to the coil 220, the amount of power W1 detected by the detector 180, and the demodulated data generated by the detector 180 change.

In this example, the resonance frequency changer 270 changes the capacitance C of the resonance coil 210 to c0 and c1 (c0<c1) based on communication data at the time of communication. To the detector 180, the reference amount of power Ref is supplied.

When the capacitance C is c0, the amount of power W1 is smaller than the reference amount of power Ref and the detector 180 generates "0" as demodulated data. When the capacitance C is c1, the amount of power W1 is larger than the reference amount of power Ref and the detector 180 generates "1" as demodulated data.

As described above, the resonance frequency changer 270 changes the capacitance C of the resonance coil 210 to c0 and c1 based on communication data, thereby enabling the detector 180 to generate 1-bit demodulated data.

FIG. 20 illustrates the way the capacitance C of the resonance coil 210, the amount of power W2 supplied to the coil 220, the amount of power W1 detected by the detector 180, and the demodulated data generated by the detector 180 change.

In this example, the resonance frequency changer 270 changes the capacitance C of the resonance coil 210 to c0, c1, c2, and c3 (c0<c1<c2<c3) based on communication data at the time of communication. To the detector 180, the reference amounts of power Ref1, Ref2, and Ref 3 are supplied.

When the capacitance C is c0, the amount of power W1 is smaller than the reference amount of power Ref3 and the detector 180 generates "0" as demodulated data. When the capacitance C is c2, the amount of power W1 is between the reference amounts of power Ref1 and Ref2 and the detector 180 generates "2" as demodulated data.

When the capacitance C is c1, the amount of power W1 is between the reference amounts of power Ref2 and Ref3 and the detector 180 generates "1" as demodulated data. When the capacitance C is c3, the amount of power W1 is larger than the reference amount of power Ref1 and the detector 180 generates "3" as demodulated data.

As described above, the resonance frequency changer 270 changes the capacitance C of the resonance coil 210 to c0 to c3 based on communication data, thereby enabling the detector 180 to generate 2-bit demodulated data. The values to which the capacitance C is changed by the resonance frequency changer 270 are not limited to the four values of c0 to c3 described above and may be greater.

As explained above, in the magnetic resonance wireless power transmission system 10e, it is made possible to perform data communication without providing a new communication module etc., which makes it possible to reduce the costs of the magnetic resonance power transmitter 100e and the magnetic resonance power receiver 200e having the communication function.

It is also possible to apply the method for transmitting data from the magnetic resonance power receiver 200e to the magnetic resonance power transmitter 100e in the fifth embodiment to the method for transmitting data from the magnetic resonance power transmitter 100e to the magnetic resonance power receiver 200e.

That is, changing the resonance frequency of the resonance coil 110 makes it possible to modulate the amount of power transmitted from the resonance coil 110 to the resonance coil 210, and also to transmit data from the magnetic resonance power transmitter 100e to the magnetic resonance power receiver 200e.

Next, a communication procedure of a magnetic resonance power transmitter and a magnetic resonance power receiver in a magnetic resonance wireless power transmission system is explained as a sixth embodiment.

(Sixth Embodiment)

FIG. 21 is a sequence diagram illustrating an example of a communication procedure of a magnetic resonance wireless power transmission system according to the sixth embodiment.

In the sixth embodiment, it is assumed that the communication method in any of the first to third embodiments is used for transmission of data from the magnetic resonance power transmitter to the magnetic resonance power receiver and the communication method in the fourth or the fifth embodiment is used for transmission of data from the magnetic resonance power receiver to the magnetic resonance power transmitter.

(Step S101) The magnetic resonance power transmitter transmits a signal to the magnetic resonance power receiver.

(Step S102) The magnetic resonance power receiver starts a communication circuit upon receipt of the signal transmitted by the magnetic resonance power transmitter. Here, the communication circuit is, for example, the coupling changer 280 when the magnetic resonance power receiver 10d in the fourth embodiment is used as the magnetic resonance power receiver, and when the magnetic resonance power receiver 10e in the fifth embodiment is used, the communication circuit is the resonance frequency changer 270.

(Step 103) The magnetic resonance power receiver transmits a communication start signal to the magnetic resonance power transmitter.

(Step 104) The magnetic resonance power transmitter transmits the communication start signal to the magnetic resonance power receiver upon receipt of the communication start signal transmitted from the magnetic resonance power receiver.

(Step S105) The magnetic resonance power transmitter starts communication with the magnetic resonance power receiver.

(Step S106) The magnetic resonance power receiver starts communication with the magnetic resonance power transmitter.

(Step S107) The magnetic resonance power transmitter and the magnetic resonance power receiver confirm authentication, transmission efficiency of the amount of power, etc. By confirming the transmission efficiency of the amount of power, it is made possible to check for, for example, the presence/absence of foreign material in the path of power transmission.

(Step S108) The magnetic resonance power transmitter starts power transmission to the magnetic resonance power receiver.

It may be possible to perform step S108 before step S101. Further, it may also be possible to perform step S108 in parallel with a series of processing of step S101 to step S107.

According to the magnetic resonance power transmitter and the magnetic resonance power receiver disclosed herein, it is made possible to reduce the costs of the magnetic resonance power transmitter and the magnetic resonance power receiver including the communication function.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A magnetic resonance power transmitter which transmits power to a power receiver having a power receiving coil, the magnetic resonance power transmitter comprising:
    a resonance coil configured to resonate with the power receiving coil at a resonance frequency;
    an alternating current power source configured to cause the resonance coil to generate an alternating current by electromagnetic induction; and
    a frequency changer configured to change, based on communication data, a frequency of the alternating current that the alternating current power source causes the resonance coil to generate, between the resonance frequency and at least one frequency except the resonance frequency so as to transmit the communication data to the power receiver by using variation of power transmitted from the resonance coil to the power receiving coil.

2. A magnetic resonance power transmitter which transmits power to a power receiver having a receiving coil, the magnetic resonance power transmitter comprising:
    a resonance coil configured to resonate with the power receiving coil;
    a coil configured to cause the resonance coil to generate an alternating current by electromagnetic induction;
    an alternating current power source configured to cause the coil to generate an alternating current; and
    a coupling changer configured to change, based on communication data, a coupling state by electromagnetic induction between the resonance coil and the coil, between a first coupling state and at least one second coupling state different from the first coupling state so as to transmit the communication data to the power receiver by using variation of power transmitted from the resonance coil to the power receiving coil.

3. The magnetic resonance power transmitter according to claim 2,
    wherein the coupling changer changes the coupling state by changing a distance between the resonance coil and the coil.

4. The magnetic resonance power transmitter according to claim 2,
    wherein the coupling changer changes the coupling state by arranging a magnetic body between the resonance coil and the coil.

5. The magnetic resonance power transmitter according to claim 2,
    wherein the coupling changer changes the coupling state by changing an angle of the resonance coil or the coil.

6. The magnetic resonance power transmitter according to claim 2,
    wherein the coupling changer changes the coupling state by changing a load resistance of the resonance coil or the coil.

7. A magnetic resonance power receiver which receives power from a power transmitter having a power transmitting coil, the magnetic resonance power receiver comprising:
    a resonance coil configured to resonate with the power transmitting coil;
    a coil to which power is supplied by electromagnetic induction from the resonance coil;
    a power receiver configured to receive power supplied to the coil; and
    a coupling changer configured to change, based on communication data, a coupling state by electromagnetic induction between the resonance coil and the coil, between a first coupling state and at least one second coupling state different from the first coupling state so as to transmit the communication data to the power transmitter by using variation of power transmitted from the power transmitting coil to the resonance coil.

8. The magnetic resonance power receiver according to claim 7,
    wherein the coupling changer changes the coupling state by changing a distance between the resonance coil and the coil.

9. A magnetic resonance power receiver which receives power from a power transmitter having a power transmitting coil, the magnetic resonance power receiver comprising:
    a resonance coil configured to resonate with the power transmitting coil at a resonance frequency;
    a coil to which power is supplied by electromagnetic induction from the resonance coil;
    a power receiver configured to receive power supplied to the coil; and
    a resonance frequency changer configured to change a frequency of the resonance coil based on communication data, between the resonance frequency and at least one frequency except the resonance frequency so as to transmit the communication data to the power transmitter by using variation of power transmitted from the power transmitting coil to the resonance coil.

10. The magnetic resonance power receiver according to claim 9,
    wherein the resonance frequency changer changes the frequency of the resonance coil by changing a capacitance of the resonance coil.

* * * * *